(12) United States Patent
Nystrom

(10) Patent No.: US 11,034,837 B2
(45) Date of Patent: *Jun. 15, 2021

(54) PRODUCTS BY UPCYCLING LANDFILL WASTE STREAMS

(71) Applicant: Kenneth Nystrom, Des Moines, WA (US)

(72) Inventor: Kenneth Nystrom, Des Moines, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,505

(22) Filed: Jun. 17, 2020

(65) Prior Publication Data

US 2020/0362172 A1    Nov. 19, 2020

Related U.S. Application Data

(63) Continuation of application No. 16/798,344, filed on Feb. 22, 2020, now Pat. No. 10,703,909.

(60) Provisional application No. 62/809,588, filed on Feb. 23, 2019.

(51) Int. Cl.
*C08L 95/00* (2006.01)
*C08L 17/00* (2006.01)
*C08L 75/04* (2006.01)
*B29C 43/00* (2006.01)

(52) U.S. Cl.
CPC ............ *C08L 95/00* (2013.01); *B29C 43/003* (2013.01); *C08L 17/00* (2013.01); *C08L 75/04* (2013.01); *Y02W 30/58* (2015.05); *Y02W 30/62* (2015.05)

(58) Field of Classification Search
CPC .......... C08L 95/00; C08L 17/00; C08L 75/04; C08L 21/00; C08L 19/003; B29C 43/003; B29C 43/006; B29C 43/22; B29L 2031/7322; Y02W 30/68; Y02W 30/58; B29D 99/0003
See application file for complete search history.

(56) References Cited

U.S. PATENT DOCUMENTS

| | | | |
|---|---|---|---|
| 6,017,595 A * | 1/2000 | Brenot | C02F 11/008 428/2 |
| 9,724,852 B1 * | 8/2017 | Rees | B29C 43/22 |
| 2005/0182160 A1 * | 8/2005 | Milani Nejad | C08K 7/02 523/343 |
| 2012/0007284 A1 * | 1/2012 | Nelson | B29B 7/00 264/331.15 |
| 2012/0077890 A1 * | 3/2012 | Mancosh | C04B 26/02 521/68 |

* cited by examiner

*Primary Examiner* — Christopher M Rodd
(74) *Attorney, Agent, or Firm* — K K Lambert; Lambert Patent Services, LLC

(57) ABSTRACT

Fossil-fuel and rubber-derived waste stream conversion to composite lumber substitutes or barrier members; the composites having material properties and uses of greater value than the solid waste stream components separately or together. Preferred combinations including waste materials derived from waste carpet, waste tires, and waste bituminous roofing shingles, all enormous problems for landfill disposal. In a range of formulation ratios, when combined with a binder, new and marketable products are made from solid waste. Improved resistance to rot, to water, and to weathering is exhibited in synergy with improved compressive and flexural strength, enabling production of a wide variety of useful and environmentally-friendly structural products, for example. Product weight and strength can be engineered to suit and may be structural members for architectural, engineering or agricultural use. Advantageously, the new products themselves can be re-used—by an end-of-life process for making more new products, achieving the capacity to make and remake multigenerational products from solid wastes and to reduce loading of landfills.

39 Claims, 20 Drawing Sheets

ROOFING WASTE     TIRE WASTE     CARPET WASTE

| TIRE WASTE | 20% | 30% | 50% |
|---|---|---|---|
| ROOFING WASTE | 40% | 40% | 40% |
| CARPET WASTE | 40% | 20% | 10% |
| BINDER | [0.1 - 0.2x (w/v)] | | |

800

1400

ROT-IMPERVIOUS FENCING

1500

ROOFING SHINGLES

POST-PRODUCTION SHAPING

XRAY OF BULLET IN MATRIX

PRODUCTS BY UPCYCLING LANDFILL WASTE STREAMS

CROSS REFERENCE TO RELATED APPLICATIONS

This application is a continuation of U.S. patent application Ser. No. 16/798,344, filed 22 Feb. 2020, now U.S. Pat. No. 10,703,909, which claims the benefit of priority under 35 U.S.C. § 119(e) from U.S. Provisional Patent Application No. 62/809,588 filed 23 Feb. 2019; said patent documents being incorporated herein in entirety for all purposes by reference.

TECHNICAL FIELD

This disclosure pertains generally to the field of solutions for diverting solid waste streams as raw materials for production of a structural substitute.

BACKGROUND

Recycling of non-biodegradable solid wastes is an urgent problem in a world that increasingly is polluted with man-made materials. "Recycling" by definition is any process in which waste products or materials are recovered, cleaned up and reconditioned, and ultimately reused. "Upcycling" relates to processes by which recovered waste materials are transformed into products of greater value. Of the 300 million tons of solid trash generated by Americans annually only 30% is recycled or composted. Of the total waste, about 60% is biodegradable, including 15% food, 14% yard trimmings, 27% paper, and 6% wood. Of the non-biodegradable materials, the major fraction of solid waste ends up in landfills after a single use cycle. Very little material is actually recovered and almost none is converted to products of greater value.

At this time, only a very small amount of material is recovered by manufacture into new products. Waste rubber (mostly as discarded tires), roofing materials (mostly as bituminous shingles in mixed construction trash), and synthetic fibers (mostly as waste carpet) are representative of waste materials that are essentially impossible or extremely expensive and difficult to market. These materials are not compostable and, even buried, remain in the environment for centuries. For years these three waste streams were not in demand because it was much cheaper to dispose of the material in a landfill. But with landfills closing due to high costs of permitting and operating, the costs of disposal are now increasing to the point that throwing a product or material away is more expensive than recovering it for re-use in new ways.

Tires have been the subject of attempts to recycle the material. The process of chipping waste tires is well known and results in a free-flowing "crumb rubber" material consisting of #10-#13 mesh rubber particles. Other grades up to pellet size are also available. Crumb rubber has been used to make synthetic turf, playground flooring, welcome mats, vehicle mudguards, or may be used as a liner or a cover for landfills. Despite these uses, a large fraction of waste tires end up buried in landfills, are disposed of illegally in rivers and streams, or are incinerated. Vulcanized rubber cannot be remelted and burns with a thick acrid smoke that reduces air quality.

Of equal concern, private interests have cleared vast sections of rainforest in Vietnam, Cambodia and Myanmar for rubber plantations, replacing vibrant ecosystems with monoculture that destroys the soil and causes downstream flooding. The land grab, fueled by futures trading, is built on a product that is used once and thrown away. About 1 billion "end-of-life" tires are discarded globally each year (approximately 20 million tons). About half of this "end-of-life" tire waste is ultimately burned and releases harmful emissions. According to Wikipedia, at least 14% of used tires are buried in landfills. Many are thrown illegally into rivers, lagoons or any land that is not aggressively policed.

Carpet disposal is on the order of 2-3 million tons a year in the USA and 4-6 million tons annually worldwide. Carpet waste may be, to some extent, recovered as a plastic resin and used to create new products such as recycled carpet, fibers, park benches, auto parts, parking stops, and backing layers, for example. Complete recovery of the resin relies on solvent-assisted depolymerization into component monomers such as the caprolactam units of nylon. Melt blending of thermoplastic fibers is another option, but while producing valuable new products, the remelt is an expensive process heavily dependent on careful sorting and washing of waste carpet by chemical type. Alternatively, carpet waste may be incinerated, the emissions contributing to poor air quality. Perhaps most harmful, carpet waste is often not separated for recovery and is disposed of in landfills. The fibers are not always biodegradable and may leach chemicals or microfiber particulates into water for hundreds of years.

Most bituminous roofing shingle scrap waste is disposed of by landfilling. The shingle sheets (termed in the industry "3-tab") lack strength and are impossible to handle and recycle without further breakage. Most of the waste contains roofing nails. The grit applied to the exterior surface of the material limits scrap recovery for high-value products. Only a small amount of bituminous roofing shingles is recovered by admixture into asphalt paving; which can contain up to 3 to 4% (v/v) of shingle-derived waste.

As a general practice, recyclers first segregate materials by type and attempt to recycle the material for its original use. Plastics, for example, must be sorted before recycling is feasible. It would be desirable to add value by converting waste materials into products having properties superior to the waste of which the products are composed. Very little or no work has been done on conversion of solid waste streams by transformative processes that result in new products. Unlike biological waste that can be converted, for example, to liquid fuels, synthetic solid waste is generally regarded as a useless material, merely a problem for disposal, and is largely buried in landfills at great expense. However, disposal is not free, and is paid for by society, by the waste generator, or by future generations.

Thus, there is a need in the art for scalable waste stream recovery processes that can convert combinations of tire, roofing and fiber waste into new products with surprising strength, wear resistance, weatherability, and environmentally acceptable uses. Preferably, the products of the processes themselves are recyclable or may be recovered by adapting the same waste stream recovery process for multigenerational product manufacture.

SUMMARY

Disclosed are products made by upcycling that converts fossil-fuel and rubber-derived waste streams that cost money to dispose of, such as tire, roofing and fiber waste, into products having environmentally acceptable uses that include architectural, engineering, and agricultural uses. The products may have surprising strength, material properties, wear resistance, and their weatherability may add value. Preferred products are structural members having rigidity and impermeability to water that are floatable and function as lumber substitutes with improved weathering and impact resistance without shattering. Yet more preferred are products that can themselves be upcycled in a sustainable cycle of endless rebirth.

In a first embodiment, the product may be a lumber substitute which is made from a mass of solid waste dispersed in a fire-resistant matrix that includes a binder, the mass of solid waste having a fraction of mixed carpet fiber waste, a fraction of tire waste as crumb rubber, and a fraction of comminuted bituminous shingle waste, the fractions adding generally to 1, the binder having polymerizable raw material precursors and an aqueous fire retardant mixture containing one or more of zinc borate, sodium silicate and iron oxide; and, wherein the lumber substitute is formable into rectilinear members, and the members are floatable on water. The polymerizable binder may be selected from an isocyanate polyurethane precursor, for example. The fire retardant mixture contains zinc borate, sodium silicate and iron oxide in water at a ratio of 60/40 to 90/10 salts to water by weight. Advantageously, the lumber substitute may be made by a process in which the cash receivable from taking the mass of solid waste from a landfill purveyor exceeds the cash payable for the polymerizable raw materials.

In another embodiment, the product may be a barrier member including a mass of solid waste dispersed in a fire-resistant matrix that includes a binder, the mass having 50% or more by weight of any two or more solid wastes selected from: tire waste as crumb rubber; comminuted bituminous shingle waste; and mixed fiber waste. The binder may be a polymeric precursor and generally includes a fire retardant. The barrier member may be configured as impact barrier, an acoustic barrier, a vibration barrier, a moisture barrier, a soil barrier, or a traffic barrier, and finds use in architectural, engineering or agricultural applications, for example.

A first instance of a process for making composite solids from waste material components entails:
a) reducing used tire waste to a crumb rubber particle component;
b) reducing bituminous roofing shingle waste to a bit component, the bits having a size range corresponding to that of the crumb rubber particles;
c) reducing carpet waste to a loose fiber component;
d) mixing the fibers, bits of shingle waste, and crumb rubber particles;
e) adding a liquid binder that generates a pressure and causes expansion of the binder volume, the pressure acting to fill any void volumes, whereby the liquid binder is distributed by the pressure as a matrix around the fibers, crumb rubber and bits of shingle waste; and,
g) curing the mixture of the components into a composite solid of defined density and bending strength, the products having structural uses.

The process may also include shaping the composite solid into a saleable product or a component of a saleable product by milling, machining, cutting, slicing, molding, extruding, fastening, assembling, or a combination of any post-production treatment.

In some instances, carpet fiber is not used, and an alternative reinforcing agent is selected. Examples of alternate reinforcing agents include polyaramide fibers, Nomex fibers, Technora® fibers, carbon fibers, fiberglass fibers, plant-derived fibers including coconut and hemp, siliceous fibers, and so forth.

In another instance, the invention encompasses making a product by a process of combining and transforming waste streams into a composite having the dimensions and physical properties of a solid structural member, in which the structural member contains metered proportions of multiple waste streams in a binder. In a preferred composition, the waste streams combined are crumb rubber, fiber waste, and bituminous roofing shingle waste. In other embodiments the binder is a liquid polyurethane and the process includes adding blowing agent. In a preferred embodiment, the blowing agent is a fire retardant.

In the process, any component or components of the mixture and binder may react by solubilization, by oxidation, by reduction or by polymerization. In some exemplary processes, the reaction is accompanied by gas formation so as to reduce the product density and improve handling qualities.

The product may be coated. Useful coatings include a reflective coating, a white coating, a colored coating, a sealant coating, a hydrophilic coating, or a hydrophobic coating, for example. Hydrophilic coatings may be used when it is desirable to promote a biological overlayer; hydrophobic coatings may be used when leaching must be minimized.

In some embodiments of the process, there is a transformation of crumbly or fibrous materials into a solid having engineering properties of density, bending resistance, failure resistance, compression loading resistance, and optionally of tension resistance and elasticity, to any degree, all characteristics that defy measurement in the starting materials. Particularly, the physical properties of the solid structural product are characterized by a bending moment and a failure limit that cannot be measured, do not apply to, or are not detectable in the component waste materials as supplied. Upcycling in this way eliminates the materials from waste that typically ends up in landfills and has poor or negligible biodegradability. Thus in another aspect, the invention may be characterized by a business model or process for diverting the waste materials, particularly waste rubber, waste carpet, and bituminous roofing shingles, from material that would otherwise end up in a landfill.

And in another aspect, by a process of the invention, a structural solid product is obtained from a mixing a metered amount of carpet waste as a loose fiber component; used tire waste as a crumb rubber particle component; bituminous roofing shingle waste as a bit component, the bits having a size range corresponding to that of the crumb rubber particles; and a binder. The process includes mixing the components each in a metered ratio with the binder and compressing the mixture to a reduced porosity, then molding or extruding the product as a structural solid. Generally the finished material will cure or harden, but once solidified, exhibits engineering properties that could not have been predicted from the components in their raw material form.

Advantageously, even the products obtained by a process of the invention can be recovered, reduced to particulates, and then re-processed, resulting in an environmentally friendly, multi-generational cycle of green products that generate no waste over several lifetimes. These products may have the added advantage that they are resistant to weather and rot and may have lifetimes of valuable use over decades or even centuries.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which.

In another process view, schematic

Figure 1:
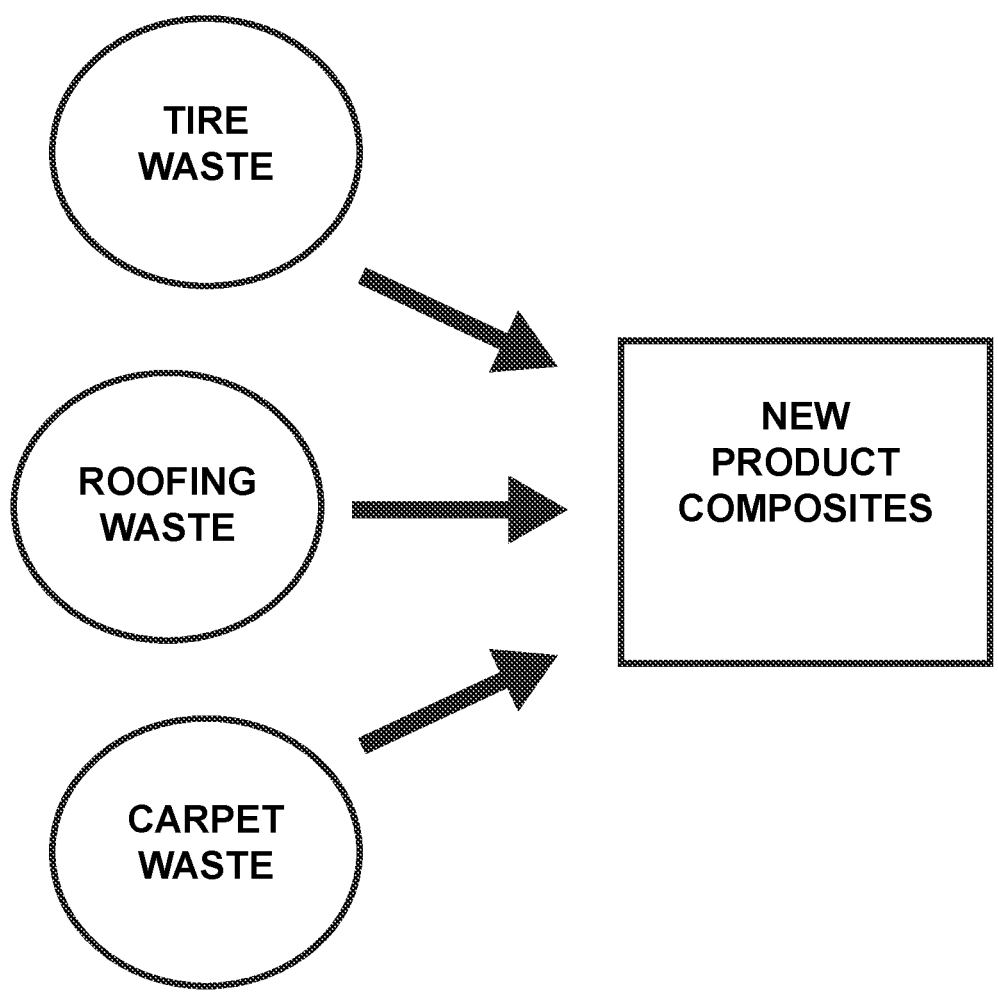
FIG. 1 is a concept view summarizing the use of solid waste streams to make new product composites by a transformative process.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

GLOSSARY

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

Material properties: refers to properties of materials that vary from material to material, for example hardness, density, modulus of elasticity, tensile strength, wear properties, fatigue resistance properties, and so forth. Material properties may be uniform from member to member, as in a monolithic article cut from a single block or an article folded from a single sheet, or may be different. The material properties of aluminum, for example are different from the properties of UHMWPE, or filled plastic, or steel, for example. Substituting one material for another results in a member having different material properties. Composite materials are a special case, the properties of which cannot be easily predicted and can be varied according to the proportions of each of the component materials in the composite.

Bending stiffness: in its simplest engineering analysis, elastic bending stiffness can be approximated by a form of Hooke's law relating torque to deformation:

$$T = K * \Delta\theta \qquad \text{(Equation 1)}$$

where T is torque, K is a spring constant reflecting the stiffness, and $\Delta\theta$ (theta) is the angular bending or deformation. A more complex model including elastic shear modulus, loss shear modulus, and dampening coefficients may also be formulated. By continuing to deform a test specimen, creep, inelastic deformation and failure limit can also be measured. Using other test methods, tensile strength, shear strength, compressive load resistance, flexural strength, shrinkage, and other material properties may be measured.

Tensile Strength: is the resistance of a material to deformation (strain) or failure on an axis under a pulling force on that axis as a function of cross-sectional area normal to that axis. The tensile elasticity is an indication of the spring force of the material when the external force. Yield strength is the elastic limit as measured by the transition from elastic deformation to inelastic deformation. Fracture strength relates to a point on a stress/strain curve at which stress is relieved by material failure. Compressive strength: is analogous but opposite of tensile strength, and relates to a force on a material and a resistance to deformation or failure on an axis subjected to a load. Composite materials often have unpredictable stress behavior; for example, inclusion of fibers can result in a change in failure mode associated with increased resistance to flexural loading but decreased compressive and tensile strength and generally a clear cut optimum percentage for each material property.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can,'" and "might" are used to indicate alternatives and optional features and only should be construed as a limitation if specifically included in dependent claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention. It should be understood that the order of steps or order for performing certain actions is immaterial so long as the invention remains operable. Moreover, two or more steps or actions may be conducted simultaneously.

For clarity, throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

DETAILED DESCRIPTION

Waste streams are combined to produce composite products having material properties not readily predicted from the individual component materials. Waste streams of known utility in the invention include combinations of waste tire rubber, roofing shingle (also termed "3-tab") and carpet or other waste fibers.

As used in the products and processes, waste tires are reduced before use to a fine mesh particulate or "granulated" material sometimes termed "tire crumbs" or "tire chip" that has been separated from any polyester or steel belts in the tires. This material may be readily obtained as a feedstock for the processes of the invention or is produced in large quantities as a free-flowing material.

Carpet waste is also comminuted in size before use. Size reduction generally takes place by a process of cutting or shredding raw carpet to a useful fiber length, generally in the range of about 0.5 to about 3 cm, depending on the strength of the fibers and the desired consistency of the product during processing and in a finished product. Carpet fibers are readily available in a variety of chemical species. The most common fiber materials are polycaprolactam (Nylon 6) and polyhexamethylene adipamide (Nylon 6,6), while not limited thereto. The web site polymerdatabase.com/Fibers/Carpets.html provides a useful database.

Carpet types generally fall into four classes of synthetic fibers and several kinds of natural fibers like wool, silk, cellulosic fibers, and cotton. The man-made classes are olefin, nylon, polyester, and acrylic. Synthetic species include nylon, polycarbonates generally, polypropylene, polyethylene terephthalate, polyurethane, polyvinylchloride, and polyesters, for example. The carpet fibers may be derived from mixed carpet waste or may be sorted according to kind of carpet. Sorted carpet fibers may be selected according to their physical properties. Polytrimethylene terephthalate, for example, is strong, elastic, and has high abrasion resistance. Carpet fibers may also be substituted or supplemented with fabric waste, cotton linters, non-wovens, and even recycled fibers derived from wood pulp and cardboard. In some parts of the world, fiber waste also includes large quantities of fishing nets.

Roofing waste contains a large percentage of damaged bituminous shingles and hence is not marketable. The material consists of sheets of a pliant solid material having a high percentage of tar, generally with a non-stick backing and a top coating of a granular siliceous solid ("grit") that is sand-like in hardness and can be colored. For use in manufacture of new products, the shingles are preferably reduced to smaller sized bits in a cutting process, and generally the preferred particle size is similar to or slightly larger than the size of the rubber chips, about #5-#10 mesh.

In a first embodiment of the inventive processes, the three waste streams, tire rubber, carpet scrap, and roofing waste, are recovered separately prior to disposal and are converted by methods and steps that effectively change the physical and chemical properties of the materials. In some instances, treatment is in part physical by heating and pressure. Generally a binder is used to form the materials into a more homogeneous composite solid, preferably a glassy or elastic monolithic solid with low porosity. The binder may be added or may be formed in place and may include additives. And in other instances a chemical reaction between the components results in improved process performance. Thus the invention is manifested in both processes for transformation of admixed waste streams and also in composite new products.

Unlike typical recycling, in which used products are separated for reconditioning and re-use, the processes of the present invention combine two or more waste streams by steps that transform the physical and chemical character of the raw materials in composite materials having new and useful properties. In the end product, the raw starting materials are not readily recognized, having been broken down and/or accreted by the process.

FIG. 1 is a concept view summarizing the use of waste streams to make new product composites. Waste tires, bituminous roofing shingles and fiber raw materials are combined in a preferred embodiment. The process of combining the raw materials is transformative, and results in new composite products having physical and chemical properties readily distinguished from those of the product precursors. In a preferred embodiment, the products are monolithic solids with limited porosity and are suitable for manufacture of a variety of marketable items ranging from fence posts to I-beams to rubbery highway barriers or flood control walls, for example.

Figure 2:
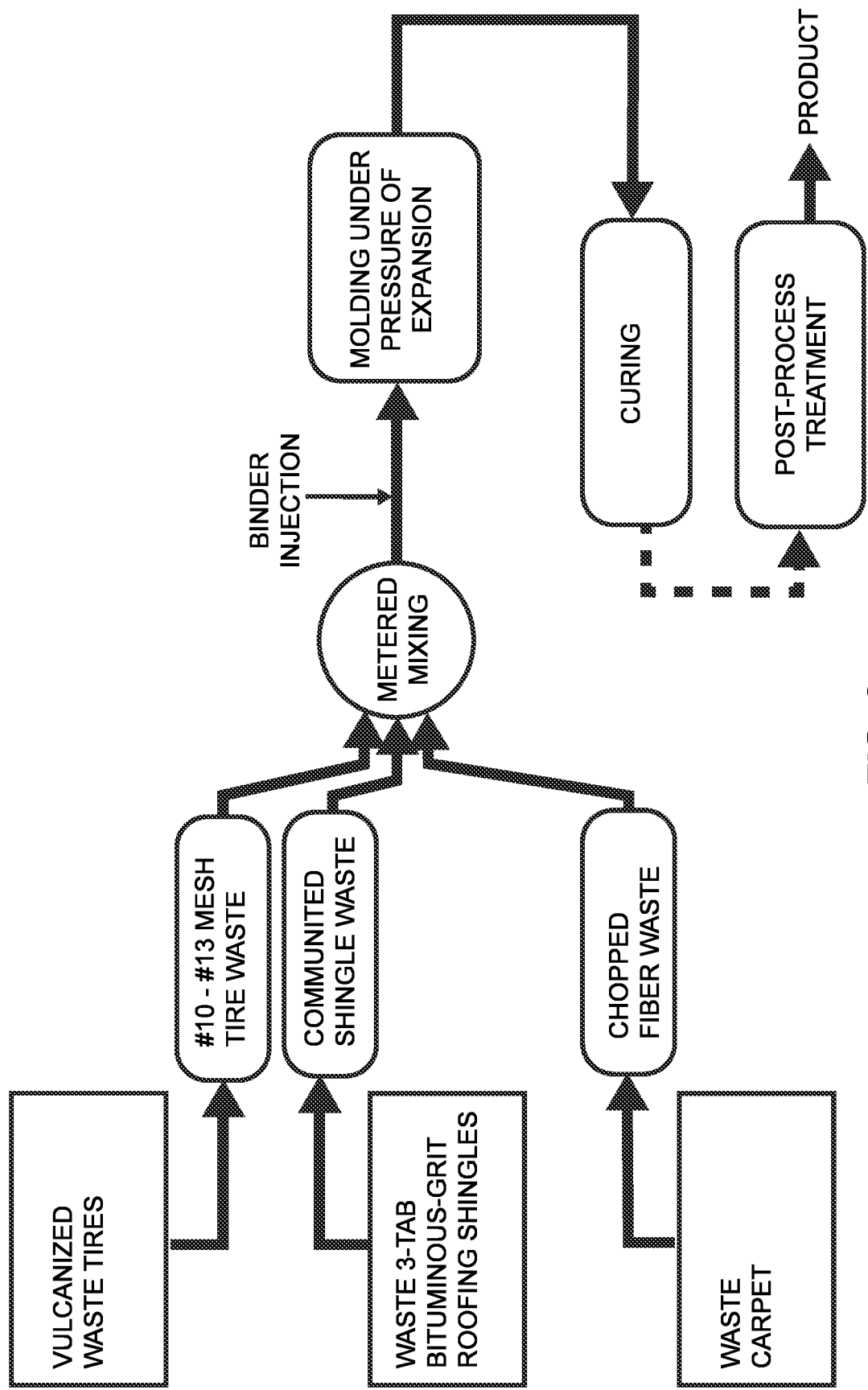
FIG. 2 is a view of a process in which molding, coating and post-process assembly are combined to make new product composites from waste streams.

FIG. 2 is a view of a process in which molding, coating and post-process assembly are combined to make new product composites from waste streams. Here, three waste streams are combined with a binder to produce product composites. In this process, the binder is injected in a metering operation. The binder may be a polyurethane resin, for example, or a mixture of polyurethane and fire repellant. An isocyanate may be used, for example, with a polyol crosslinker and a catalyst. Water may be used to expand the resin so as to entrap the solid waste materials in a polymeric matrix. By adding the blowing agent and crosslinker, the resin fills the voids between the waste streams and the crosslinker increases stiffness. By adjusting the formulation, an engineered solid is obtained. Density and stiffness can be dialed in.

In a pre-process step, the raw materials are treated by size reduction. Tires are chipped to produce "crumb rubber".

Shingles are shredded or cut into small pieces so as to be metered and mixed. And carpet or fiber length is reduced by cutting or chopping to a suitable length according to the desired consistency and flexural strength of the product.

Mixing is followed by impaction, generally in a hydraulic press or under a platen with pressure. In some instances, heating complements the pressure treatment. The materials may be formed by molding or extrusion before hardening, which is a chemical process aided by the binder. Generally a glassy solid or elastic solid results, but the properties are dependent on the ratio of the raw materials and binder. A significant level of homogenization is achieved, but the materials are generally recognizable in the final product and thus are a composite or aggregate in physical composition. However, the degree of homogenization that is achieved results in emergence of new physical properties such as fire resistance, flexural strength, increased compressive loading resistance, and resistance to weathering, rot and insects. Water resistance is also gained, allowing the materials to be used as moisture barriers, retaining walls, waterproof liners, irrigation channels, roofing tiles or shingles, walls, posts and fencing, while not limited thereto.

Products are generally saleable as is and can be distributed directly to end users. Because of their durability, weather resistance, and environmental friendliness, they find wide use in agriculture, civil engineering, highway safety engineering, and construction. Advantageously, the products may be recovered after use and subjected to the same processes by which they were made (size reduction followed by formation of glassy or elastic solids) so as to be put to multigenerational uses.

Coatings that may be applied are dependent on the surface properties of the solids and some level of adhesion to or fusion with the outside surface of the product is desirable. Coatings may increase the reflectivity and visibility of the products, and add color, such as for highway and construction uses, and may also modify the hydrophobicity and wettability of the product, such as for agricultural and aquatic uses. In some instances, biodegradable hydrophilic coatings may be applied so as to promote surface growth of plants or organisms.

Figure 3:
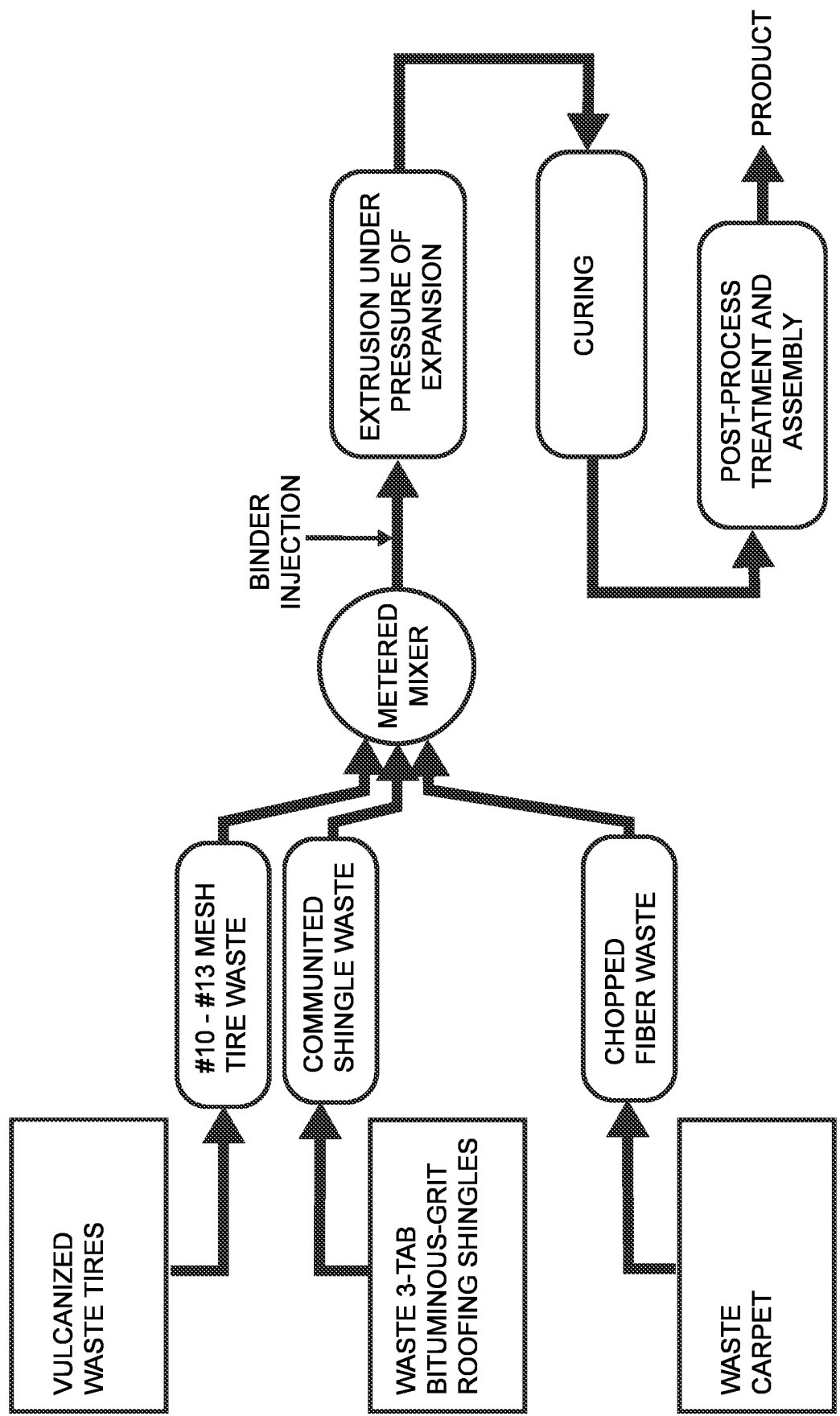
FIG. 3 is a view of a process for making product composites in which extrusion is performed.

FIG. 3 is a view of a process for making product composites in which a screw impeller, progressive cavity, or reciprocating pump is used. In order to generate pressures that could be in the range of 20 to 200 psi for processing, a screw impellor is used. Rather than operation in batch mode, the loading and throughput of raw materials can be continuous, allowing new products to be made. While extrusion is shown here, molds can be filled in a belt process that empties and recycles the molds. Or the mixture can be spread onto rollers and pressurized so as to fuse into a sheet or thin layer of a relatively homogeneous material suitable for roll-to-roll post-processing.

Coating processes may be used to modify the surface properties of the products. In this was coloring and visibility may be selected according to the user's needs. Reflective coatings may also be applied to improve products deployed for highway safety. The coating process may also seal the product if the binder has not fully saturated porous voids in the solid and provide a smoother and easily cleaned surface.

Figure 4:
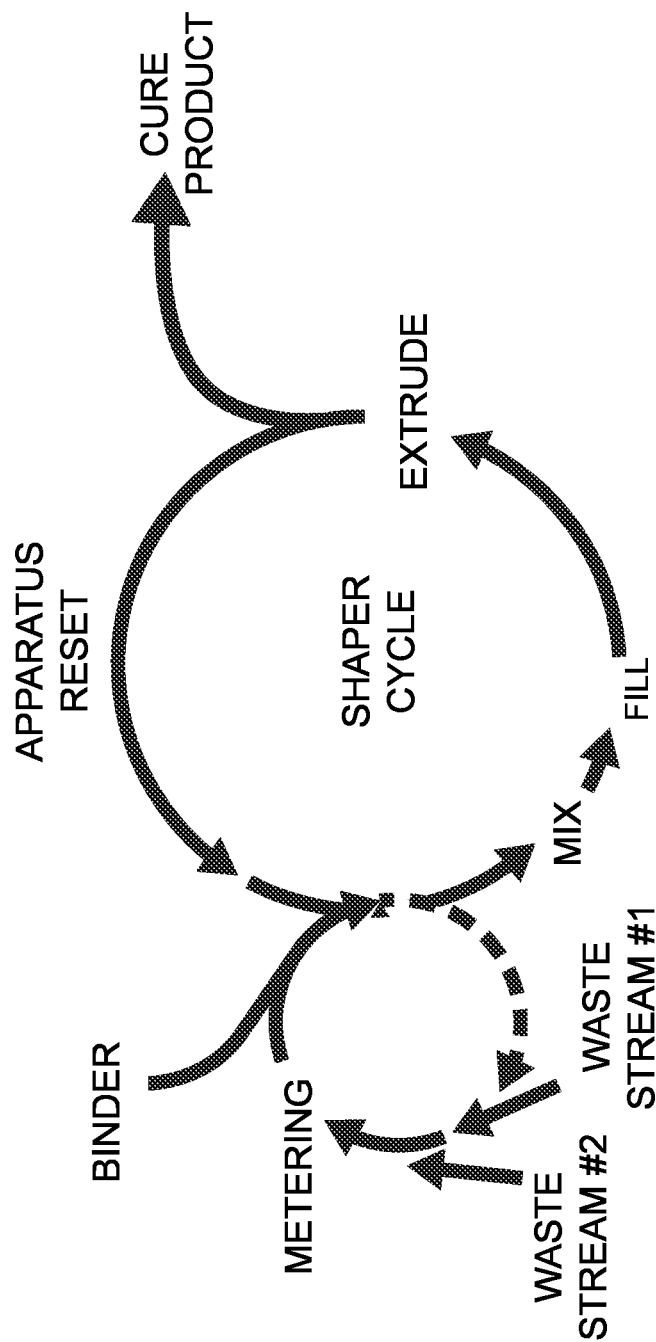
FIG. 4 shows a basic "unit cycle" consisting of steps for filling, mixing and packing the waste and binder followed by product extrusion.

In another process view, schematic FIG. 4 shows a basic "unit cycle" consisting of steps for filling, mixing and packing the waste and binder in an apparatus followed by product extrusion and a reset of the apparatus prior to loading for a next cycle. In a fill step, solid waste and binder is loaded into a mold. Mixing occurs primarily prior to fill. In a packing step, the waste material is compressed with binder and with venting of void volume to create a solid. After packing is complete, but prior to extrusion, the product may be cured under pressure. The product extrusion step separates the solid from the mold, and the mold is then reassembled into the apparatus prior to beginning a next cycle.

In an epi-cycle, the three waste materials are metered into a feed stream with initial mixing. A more complete mixing step is performed after the correct proportions of materials have been added. The second mixing step also has the effect of partially linearizing the fibers in the matrix so as to increase tensile strength.

Here the waste streams are termed, generally, Waste Stream #1 and Waste Stream #2. As currently practiced, the first waste stream includes a mixture of tire waste ("crumb rubber") and bituminous shingles waste ("3-tab"). The solids have been reduced to a particulate prior to use. The second waste stream is the fiber waste (such as carpet fibers or tire "fluff" from polyester belt recovery), and is metered separately because of its lower density. Binder is also metered and added separately. The materials are mixed with the binder to wet the mixture. Air in void volumes escapes to a vent by following gaps between the solid particles. Fibers help to keep the porosity of the mixture sufficient to allow escape of air and wetting of the solid particles. Ultimately, under pressures of sufficient for extrusion, the air is fully displaced and on solidification, the product is impervious to water and generally resistant to weathering, rot, and leaching.

Processes of production may be run as a semi-continuous batch or a continuous process. For simple slab shapes and patterns, a platen press may be used. Once a load of sufficient loose volume is loaded into a mold, the platen then compresses the material until porosity is reduced or eliminated and the binder is evenly distributed in the mold. The platen is then raised and the product is discharged from the mold. The process is then repeated in a batch process.

Continuous and semi-continuous processes are also contemplated. In one instance, while not limited thereto, an extrusion process may be fed with measured ratios of the waste streams and binder. Under pressure, the material is transformed and shaped and then allowed to set or cure into a continuous line, bar, pipe or slab of stock material that can be sectioned or cut to length. Alternatively, a mixture of the material wetted with binder may be rolled out and smoothed into tiles, ribbons, and cut to shape or layered for new uses.

In some instances, incorporation of two instead of three waste streams may be desirable where one waste material is not available or where the product desired has the highest quality when only two raw materials are used. For example, a product may include carpet fiber and roofing shingles with binder, omitting the crumb rubber. Alternatively, crumb rubber and roofing shingles may be used, omitting the carpet fiber. In other instances, other waste may be included such as crushed glass or plastic. Thermoplastic is a good choice, and may be mixed with rubber, fiber or bitumen to produce products having unexpected but useful properties in a process that uses pressure and heat. By using thermoplastic, less binder may be needed. Tire "fluff" (the fibrous salvage from their polyester belts) may be used in place of carpet fiber. Solvent streams may also be used where the material is found to harden so as to encase the solvent or the solvent reacts with the material to become a solid. A blowing agent and crosslinker may be used to modify the material strength and density. These variations are within the scope of the invention.

In some instances, by vigorous compression with binder and with venting, the material is transformed and takes on a new consistency. As the material hardens, the physical properties of the product also change. In this instance, desirable structural strength is achieved and in a final step of the cycle, a finished product extruded (bold arrow).

Alternatively, under lower pressure and using a blowing agent, a light and floatable matrix containing embedded solids is formed. In some instances the fibers are entirely wetted in the binder and confirm tensile strength. The 3-tab roofing waste may lose its identity as a particulate and become part of the matrix. Some products, made without rubber particles, are less compressible. Other chemical additives may include cross-linkers, catalysts and fire retardants, for example.

The end product may serve as a lumber substitute. Finished lumber substitute may be a fencepost, a 2×4" stud, a slab that will be sectioned into blocks or beams, a plank, a siding member, a shingle, and so forth.

Figures 5A, 5B:
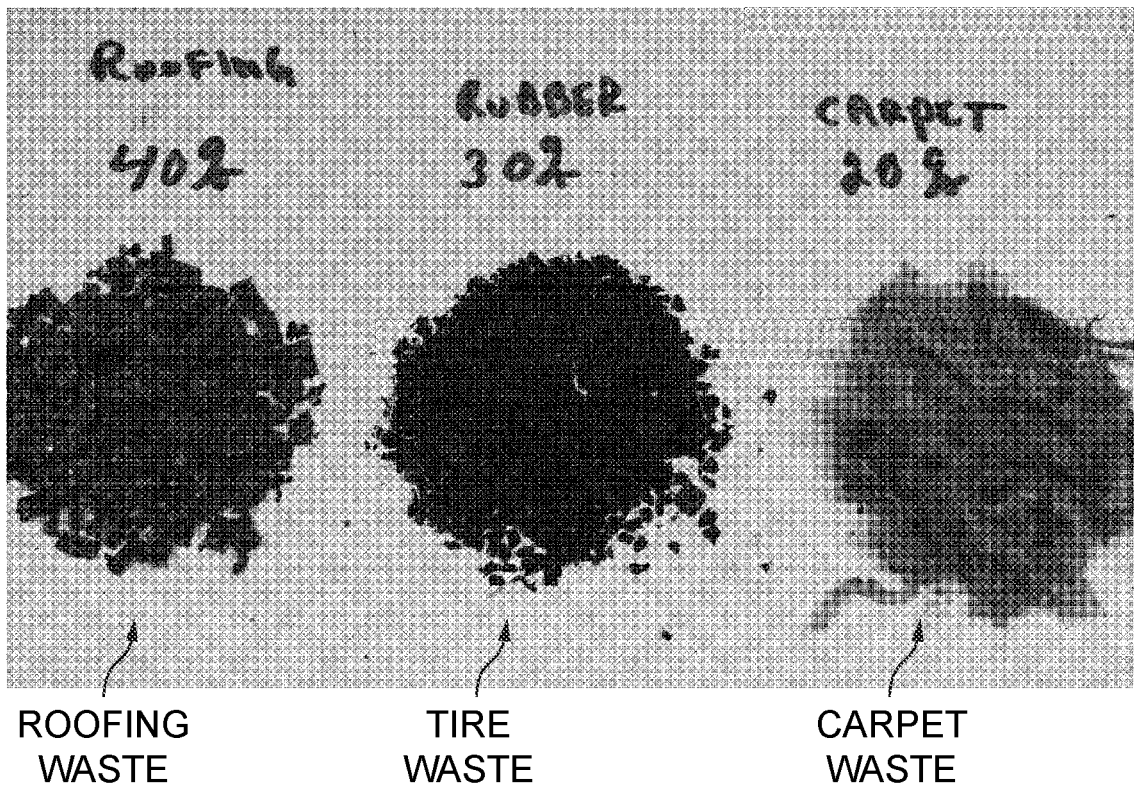
FIG. 5A illustrates raw materials used in a solid waste recovery process according to one embodiment.
FIG. 5B is a table showing a range of material ratios in representative products made from the solid waste.

FIG. 5A illustrates raw materials used in a solid waste recovery process according to one embodiment. At the left, crumb rubber tire waste is shown. The material is specified here as #10 to #13 mesh and is granulated to a few millimeters in particle size and is free-flowing and relatively monodisperse when mixed and treated by the process. In the middle is a sample of comminuted bituminous shingle roofing waste. The bituminous waste with grit is sized to be about the same particulate grade as the crumb rubber, but may be somewhat smaller or larger depending on the experience of the operator and the economics of the process. Waste shingles as received are generally broken and twisted, so the cutting and granulation process is physically demanding and must handle irregular flow of material. Leftmost in FIG. 5A is a sample of carpet waste. These can be individual carpet staples or can be cut, shredded or chopped to a preferred length distribution. Carpet is often nylon, but other carpet species may be used, including natural materials such as wool. The carpet fibers may be supplemented with percentages of other fibers such as waste paper. The lighter density carpet fibers are mixed into the process feed of heavier shingle and tire waste before or after adding binder. Alternatively, the carpet fiber stream can be wetted with binder before adding the heavier materials. Adequate mixing is needed to homogenize the aggregate and develop synergy in the composite physical and chemical properties. Surprisingly, the composite with sandy grit from the shingles improves the compression strength of the mixture, and the fibrous content at optimal ratios improves the flexural strength. Elastic fibers such as nylon are associated with a rubbery elasticity of the product solids when used in the composite with tire waste and a suitable binder.

FIG. 5B is a table showing a range of material ratios in representative products made from the solid waste. Not all ratios are suitable; for example adding too much carpet can result in a fragile product that tears easily. By use of optimal ratios and by adding binder, a relatively glassy solid with hardness and compression resistance is obtained. Pressurization at 400 psi results in a compression ratio in the range of 1.5-2.0 (v/v), depending on the formulation. By increasing pressurization to 2000 psi, compression final volume is reduced and the ratio is in the range of 0.5 to 1.0 (v/v).

A product according to one embodiment is a lumber substitute. The lumber includes a mass of solid waste and a matrix with binder in a ratio, and the ratio is in the range of 60/40 to 90/10 solid waste to matrix by weight. The ratio may be in the range of 70/30 to 90/10 solid waste to matrix by weight.

Other waste materials may also be used as substitutes for one or more of the components or as fillers or additives. Alternative materials include crushed glass, plastics and cellulosic waste such as cardboard and paper. While a preferred combination includes waste rubber, waste shingles and waste carpet, the invention is not limited to those preferred components and other combinations are readily shown to be compatible with the process. Styrofoam for example is difficult to recycle, but is readily compressed and embedded in the products described here. The oceans are awash in plastics that are in need of collection for reprocessing.

Binders are generally polymers that are introduced as a liquid or viscous concentrate, mixed with the solid waste, and cured to form an insoluble matrix in which the waste material is embedded. The shingle waste may be miscible with the binder, and the fiber waste is dispersed in the matrix. Fibers may be oriented to improve tensile strength.

Pressures used in the process to effect compression may range from about 15 to 40,000 psia as currently practiced. In some instances, the inclusion of a decomposable blowing agent provides the pressure by which a molded product is formed; as the matrix expands with tiny gas bubbles, the form of the mold fills and the product is allowed to harden in place under a pressure of its own making.

Figure 6A:
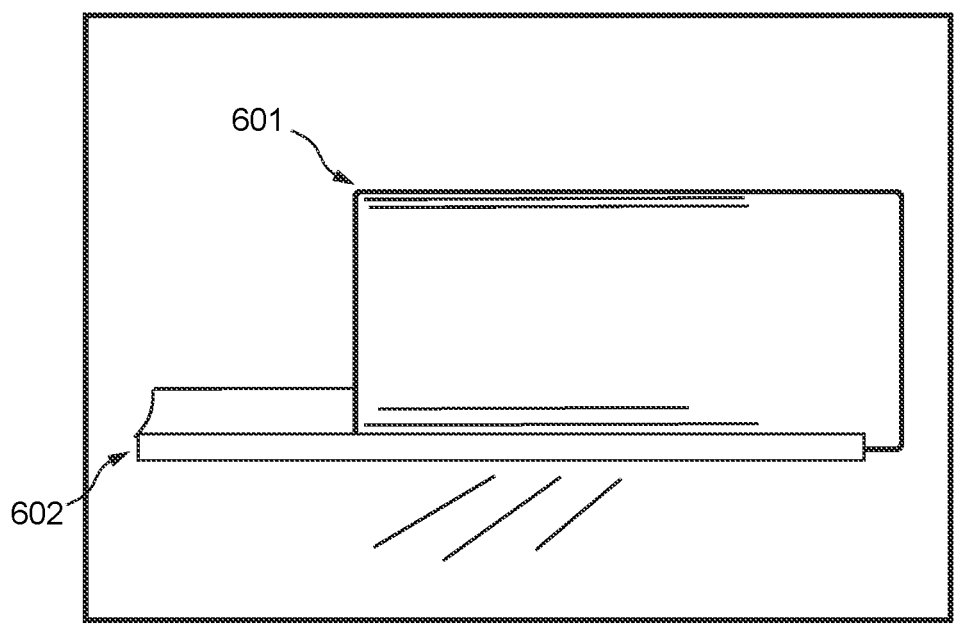
FIG. 6A is a view of a compressed plug of the matrix with embedded tire, bituminous shingle and carpet waste in a matrix of binder.

FIG. 6A is a view of a compressed plug 601 of the matrix with embedded tire, bituminous shingle and carpet waste in a matrix of binder. Also shown is a fragment of 1" pipe used to mold the plug. The sample is exposed by cutting away the mold 602 so that the compression ratio is evident. Most of the pipe is removed to expose the plug. As shown, after compression and curing, a stiff solid with a high degree of homogeneity in dispersity of the rubber particles is obtained. Matrix with 3-tab bituminous mass in binder is evenly distributed between the particles of crumb rubber. With suitable compression and venting, the air-filled void volume in the bed of raw materials is eliminated without the need for pre-packing. Rubber crumbs and small knots of carpet fibers may be evident in the matrix, but the sample has a surprising hardness.

Figure 6B:
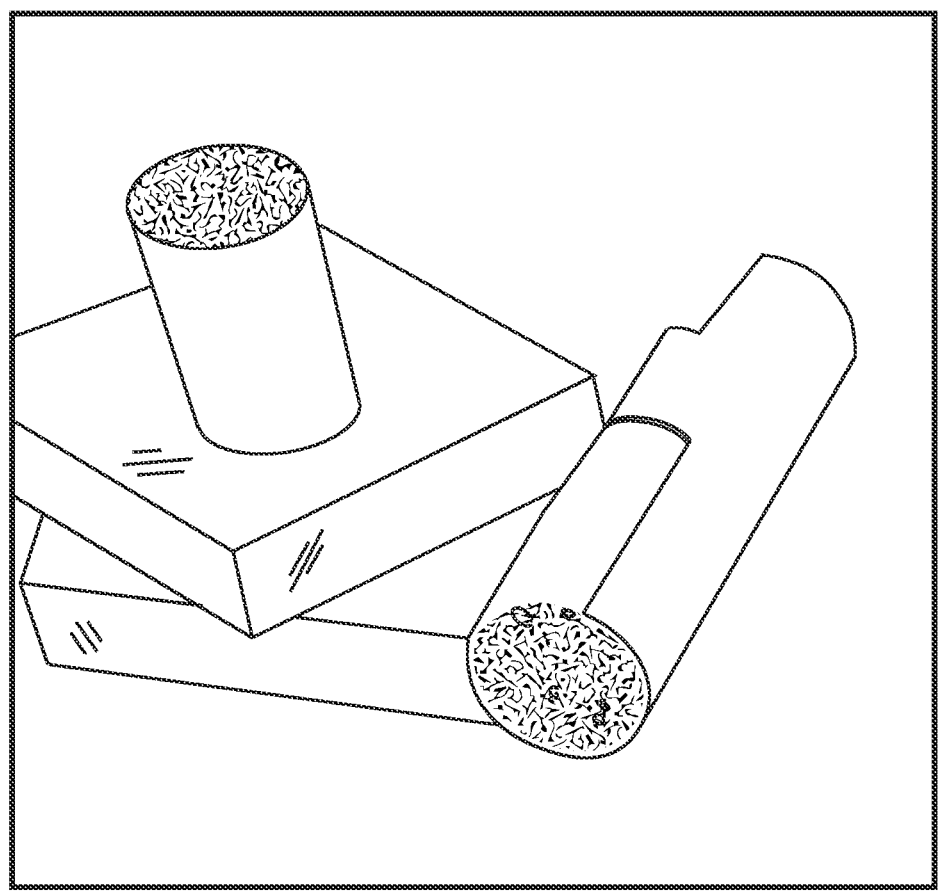
FIG. 6B shows a plug made in a scaled-up process of compression molding in a PVC pipe.

FIG. 6B shows a plug made in a scaled-up process of compression molding in a 2" pipe. For comparison, a length of pipe filled with uncompressed material is shown. The ratio of plug to pipe length is about 40% in this instance but can be varied according to a target density.

Figure 7:
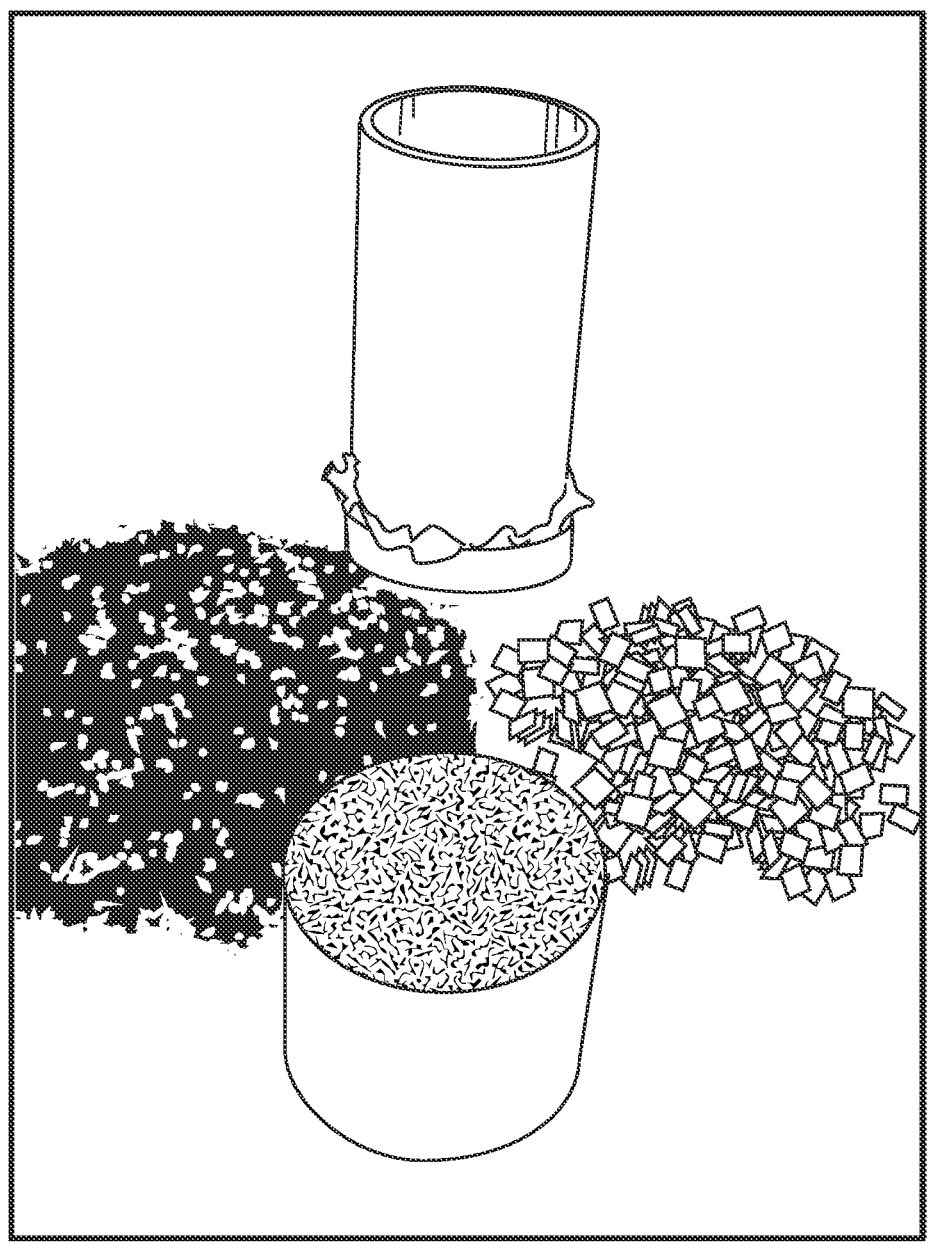
FIG. 7 is a photo of sample plug (foreground) after compression in a pipe mold (background).

FIG. 7 is a photo of sample plug (foreground) after compression in a pipe mold (background). The sample is exposed so that the compression ratio is evident. Also shown are samples of raw solid waste materials measured out for the process. At the center right is a pile of broken bits of 3-tab shingle; center left is crumb rubber.

Figure 8:
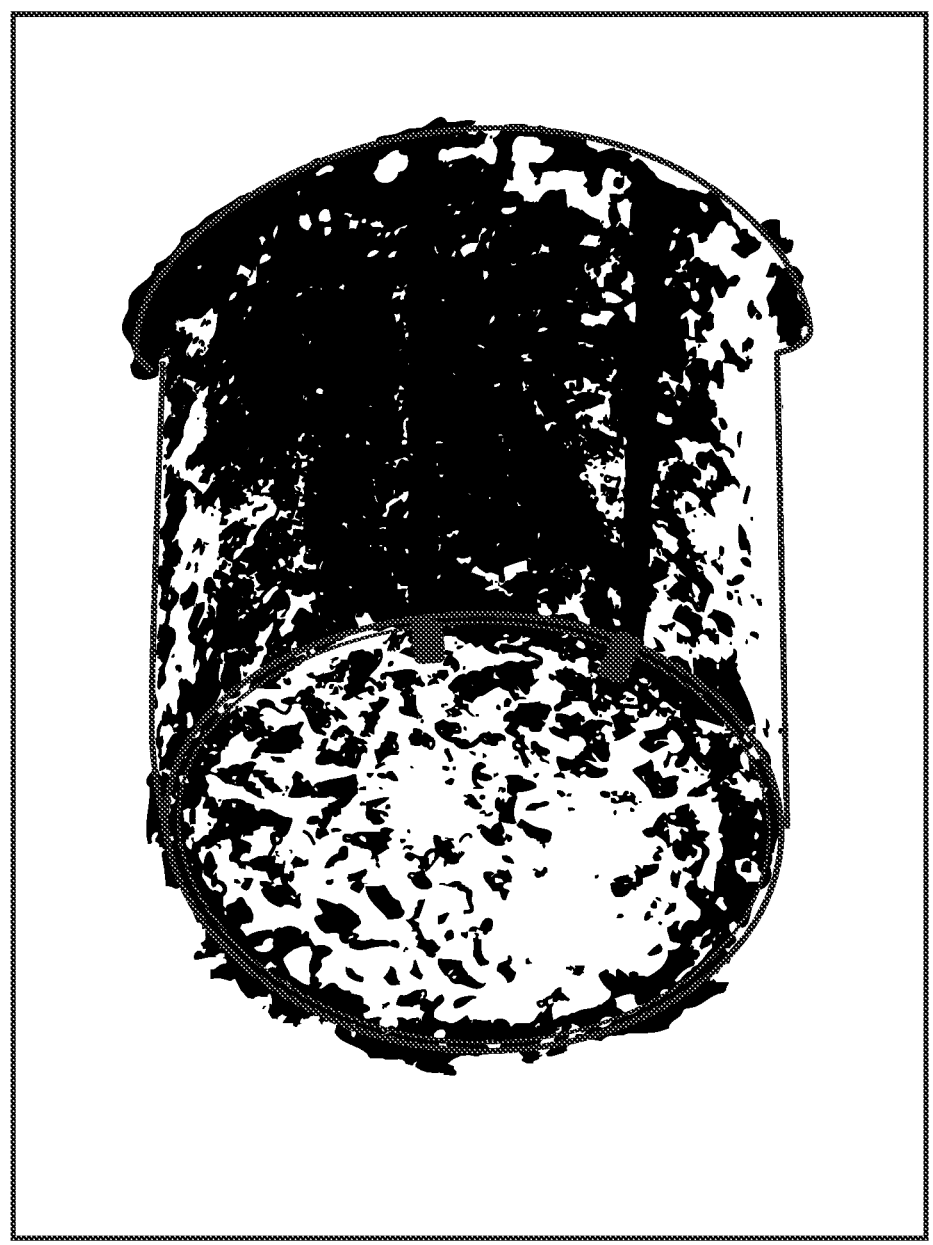
FIG. 8 is a view of a sample plug 800 illustrating crumb rubber and surrounding matrix.

FIG. 8 is a view of a sample plug 800 illustrating crumb rubber and surrounding matrix. The sample plug is about 6 cm in length and 2.5 cm in diameter. The plug is made with an adjusted ratio of waste tires, roofing tile and fiber raw materials in an organic binder and compressed before solidification. The line on the outer surface is a cut line made to pull the sample from a mold after compression and hardening. Saw cuts were used to free the plug from a pipe mold. As can be seen in this closeup, there is a matrix between crumb rubber particles, and the matrix appears to be relatively homogeneous without evident separation in the matrix of the bituminous roofing shingles and a somewhat glassy polyurethane binder. Without being bound by theory, the homogeneity of the matrix is indicative of a chemical reaction—at least a partial solubilization of the shingle material in the binder—followed by hardening of the matrix to a rigid solid. Bits of siliceous particulate material from the roofing shingles are also evident and add hardness to the matrix.

By the action of the compression, the matrix is evenly distributed between the crumb rubber particles. The carpet fibers are wetted by the matrix and the porosity of the mixture. Specs of hard sandy grit (from the roofing shingles) are observed in the matrix, providing added compression resistance. With added pressurization and venting, a fully filled solid is obtained. Alternatively, low density materials are achieved.

Products are trimmed to needed sizes and may be coated as desired after or during the process. While the minimal thickness is limited by the size of any crumb rubber particulate, tiles, siding and roofing products may be formed as sheets, for example. These materials are generally waterproof, weather resistant, and provide a level of insulation.

Figure 9:
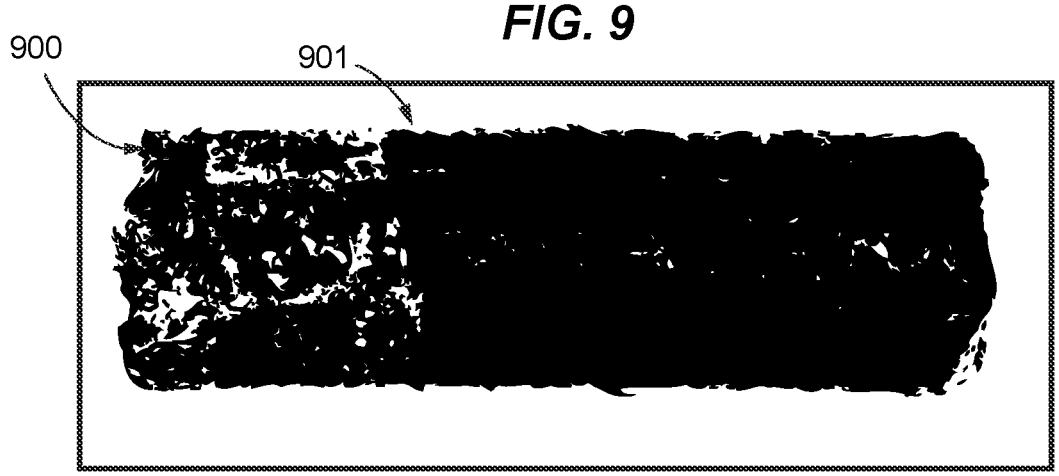
FIG. 9 is a view of a sample plug 900 with dip coating 901 of an oil-based paint.

FIG. 9 is a view of a sample plug 900 with dip coating of an oil-based paint. In some instances latex paints may also be used. The coating extends to the mark 901, about ¾ of the length of the plug. Coatings can be used to apply pigment or adhesive, for example. The overcoat seals any carpet fiber and has a finished appearance. Colors may find application in yard and garden products. Graphics such as lettering and figurative designs may be applied by a coating or printing process.

Figure 10:
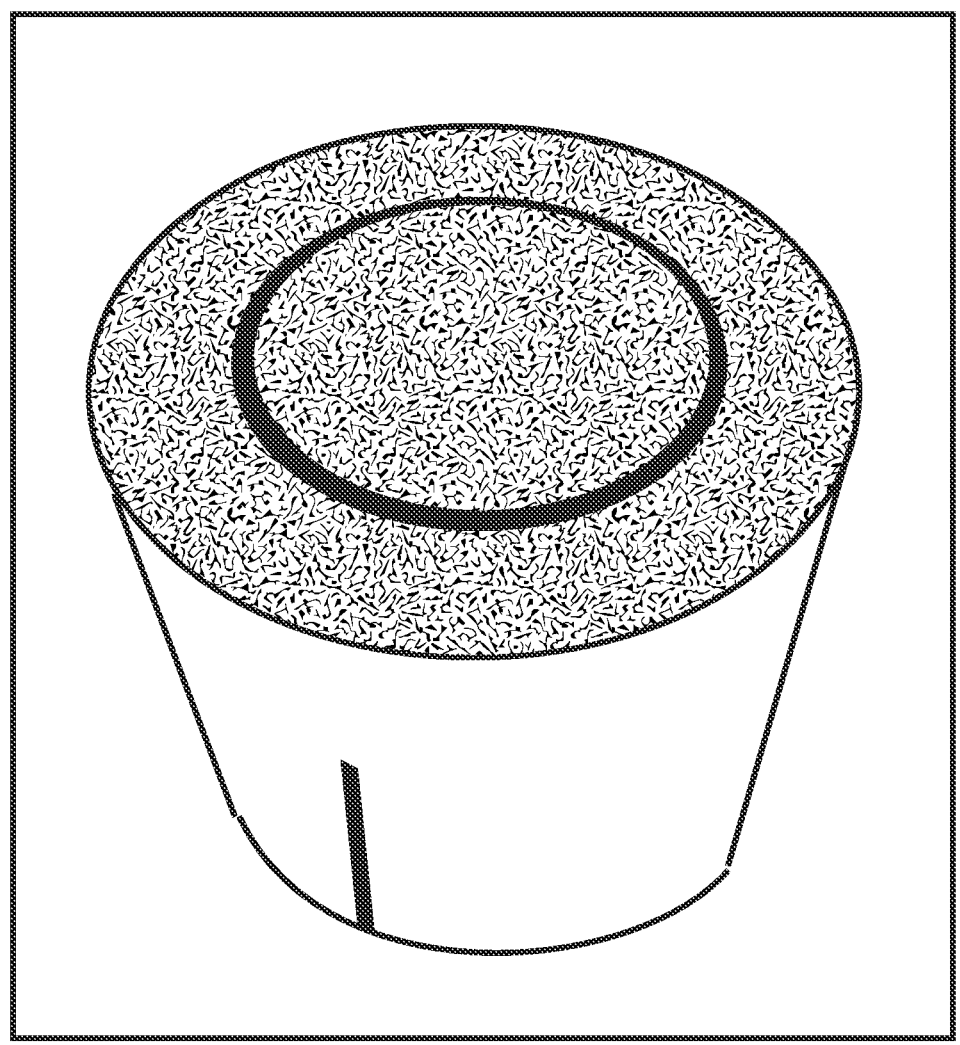
FIG. 10 a photo of a larger sample plug (diameter 4") with reddish fire retardant binder.

FIG. 10 a photo of a larger sample plug (diameter 4") with reddish fire retardant binder. The stippled texture is the embedded crumb rubber. The indented ring on the top of this large plug is left by a piston used to adjust the density of the end product. Carpet fibers seem to be completely wetted and the roofing material is not clearly recognizable, again a showing that there has been a chemical reaction or solubilization of the bitumen in the binder under high pressure, a very surprising result, more than mere wetting, and one that would not have been predicted. When fire retardant binder is used, in addition to compression from an external press, the binding material expands and expels air from the mold. When not enclosed under pressure, the binding material expands with small bubbles of gas, again a showing that a reaction has occurred. The red color is due to zinc and iron as borates in a polymeric matrix.

Figure 11:
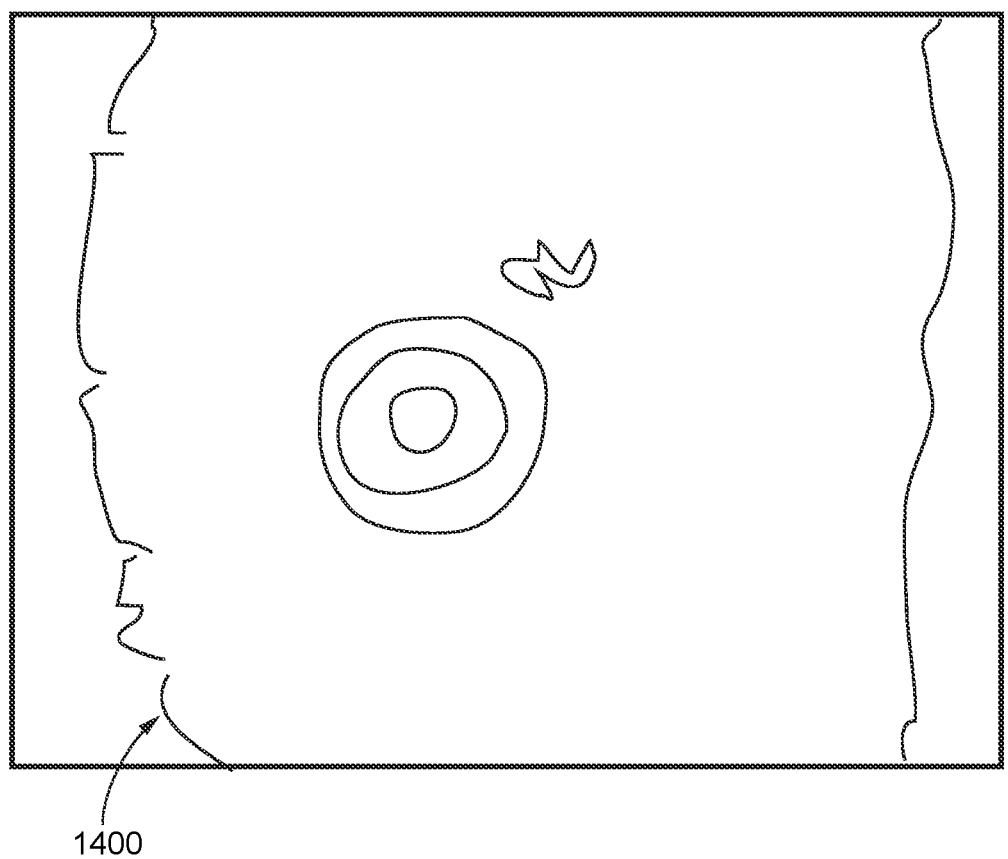
FIG. 11 shows the sample plug of FIG. 10 after prolonged exposure to a propane torch flame.

FIG. 11 shows the sample plug of FIG. 10 after prolonged exposure to a propane torch flame. Scorching is apparent but no smoke or flame was observed, demonstrating fire resistance of a composite material according to one embodiment. The matrix was first modified during process by adding a flame retardant.

Figure 12:
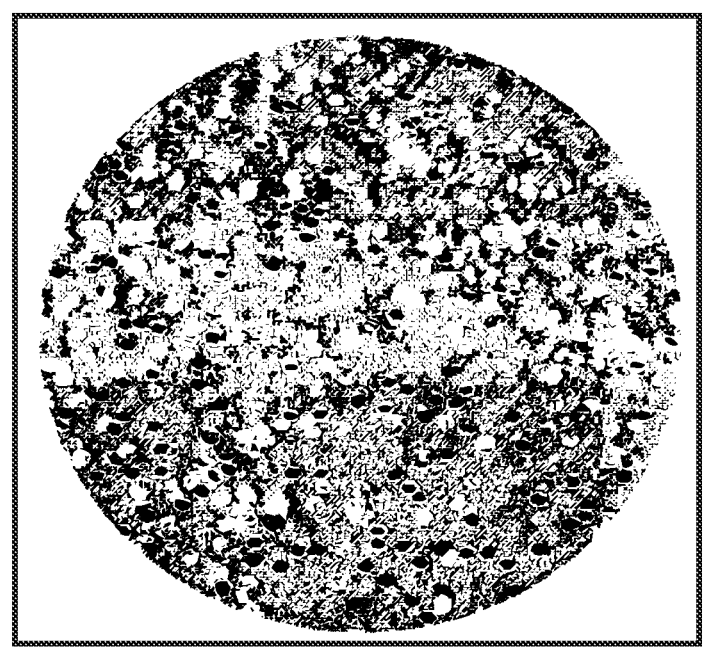
FIG. 12 is a close-up view of the composite of FIG. 10 that shows the texture in a sawcut cross-section.

FIG. 12 is a close-up view of the composite of FIG. 10 that shows the texture in a sawcut cross-section under magnification. While crumb rubber inclusions are noted, 3-tab solids and carpet fiber are no longer identifiable by visual inspection.

Figure 13:
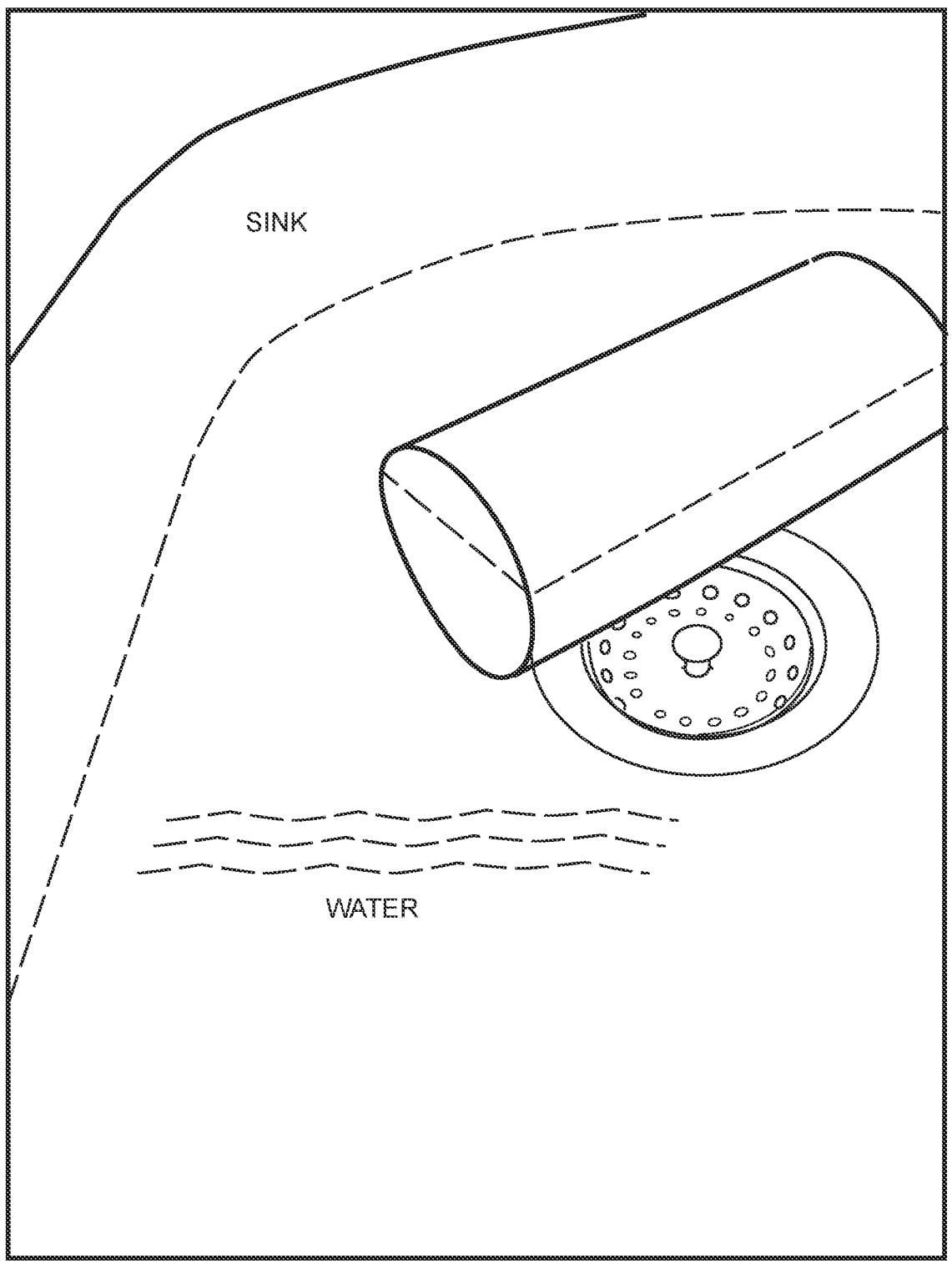
FIG. 13 is a view of a cylinder of a plug of a synthetic composite "wood substitute" material floating in water in a sink.

FIG. 13 is a view of a 4" diameter cylinder (about 9" long) of a plug of the synthetic composite "wood substitute" material floating in water in a sink. The density of the material is about 0.85 specific gravity. The reddish color results from inclusion of a fire retardant agent in a polyurethane matrix.

Figure 14:
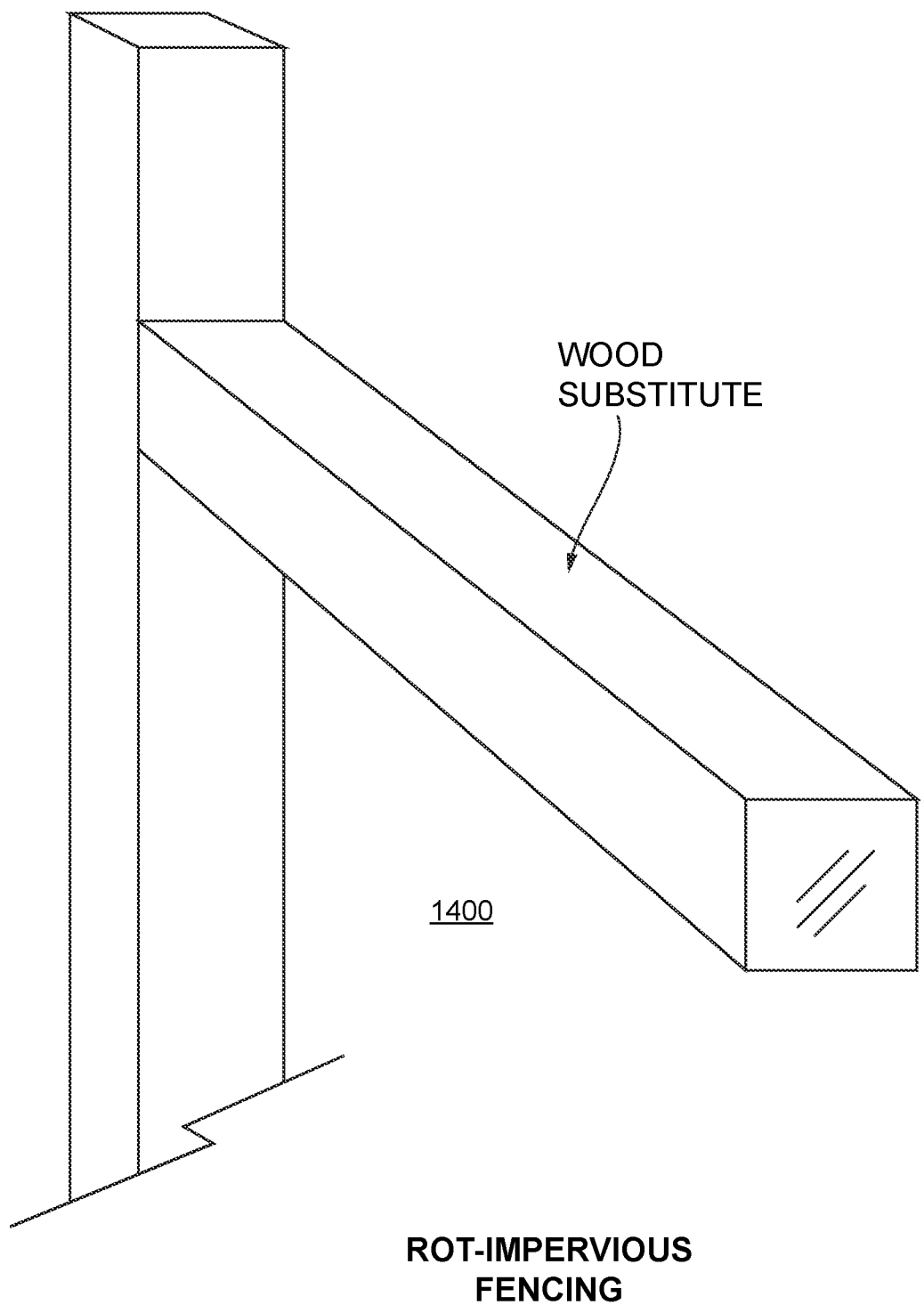
FIG. 14 shows a perspective view of a rot-impervious fence post 1400 and crosspiece made with a composite material that serves as a wood substitute according to one embodiment.

FIG. 14 shows a perspective view of a rot-impervious fence post 1400 and crosspiece made with a composite material that serves as a wood substitute according to one embodiment. The cross-sectional shape of posts and beams made by the process can be varied according to the shape of the mold, or machining can be used to cut a desired shape. Patterns and detailing, including ornamental designs, lettering and structural features, can also be printed on or embossed in the matrix during molding, or can be applied or cut post-process, for example.

Figure 15:
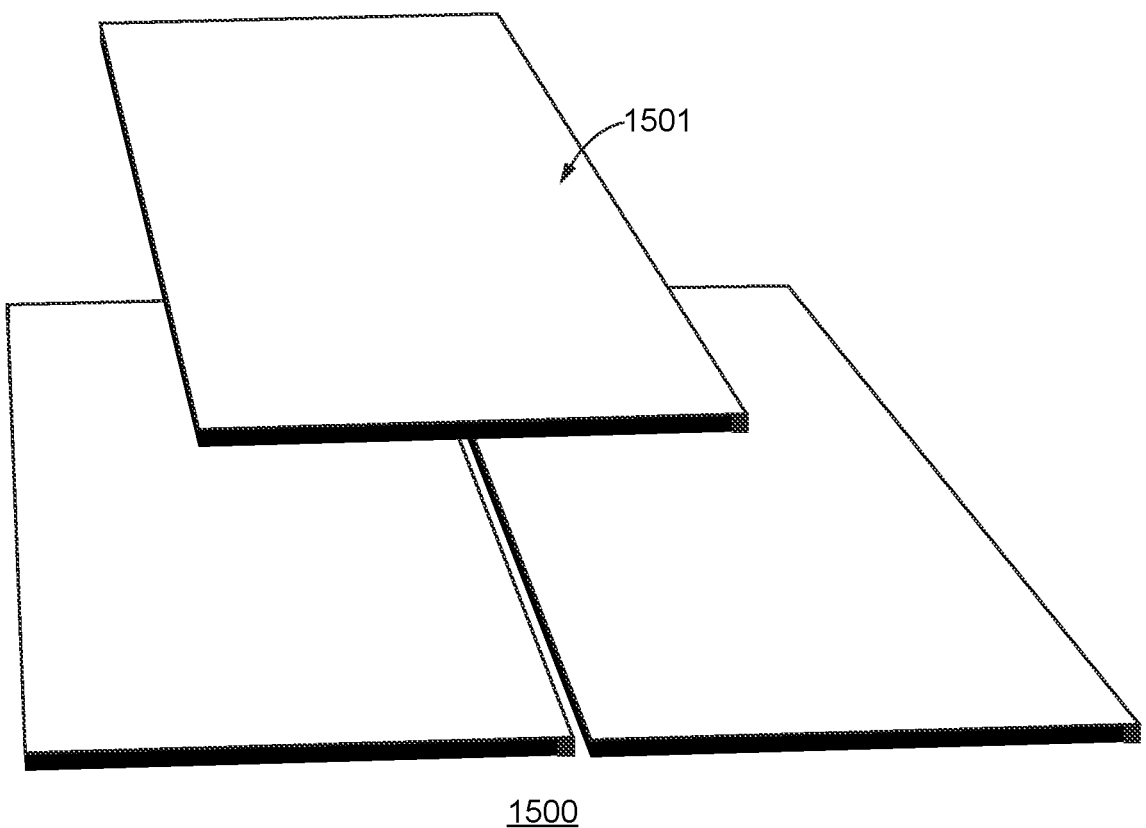
FIG. 15 illustrates production of a roofing shingle 1500 from upcycled waste material.

FIG. 15 illustrates a roofing product 1500 with shingles 1501 from upcycled waste material. By using bituminous shingle material to make new recyclable shingles, a virtuous cycle is achieved. The new recyclable shingles may themselves be recycled in a derivative process or mixed with added new solid waste material so as to create a multi-generational product cycle in which 3-tab shingles made from fossil-fuel oil and tar are ultimately eliminated from the market. The texture on the surface of the shingles may be adjusted to achieve a non-slip surface and the hydrophobicity may be sufficient to achieve water repellency. Moss resistance agents may also be incorporated. Pest resistance is generally high.

The composite material can be machined, milled and painted, individual pieces can be joined into larger structures. The material is useful as a building material and for example, can be used to frame a house. Advantageously, the material is rot resistant and may be in direct contact with soil or standing water without weakening. These products can be made by batchwise or semi-batchwise pressuring of raw materials in a mold. A continuous extrusion process through a mold aperture is also conceived and has the advantage of orienting fibers for increased strength and efficient displacement of gas pockets by using two or more extrusion apertures, each of a smaller dimension. Continuous production also decreases the workload in the process and reduces cleanup, but requires a formulation that can set to a final shape without needing a curing step to be stabilized dimensionally.

Surprisingly the material can be sawn, sliced, nailed and milled, as is not possible with the raw waste materials. In addition the composite material possesses material properties of flexion, compression and bending that are not present in the raw materials, and can be made into useful solid shapes as shown in FIGS. 13, 14, 15, 16A, 16B, 17A, and 17B, for example, while not limited thereto.

In one embodiments as shown, the product is in the form of a barrier member configured for impact resistance as a traffic barrier. But in another, the product is in the form of a barrier member configured as a roofing shingle or siding. In yet other embodiments, the barrier member is configured as a flood control barrier. More generally, the barrier member is configured as impact barrier, an acoustic barrier, a vibration barrier, a water barrier, a moisture barrier, or a soil barrier, and barrier products can be used for example to control flooding. The barrier member may be produced as an extruded, a rolled, a stamped or a molded member and may have a machined or coated surface. Fire resistance is desirable in traffic and housing uses, for example, and surprisingly, may readily be achieved by adding a fire retardant to the binder, augmenting its impact and fragmentation resistance.

Figure 16A:
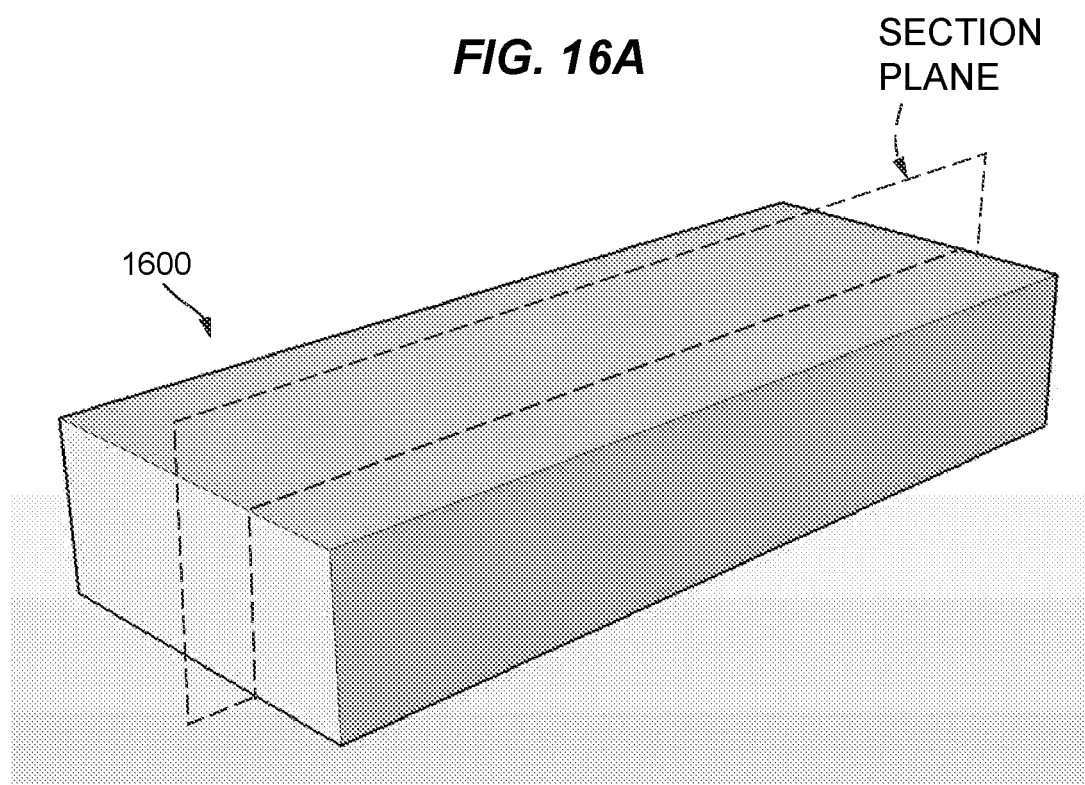
FIGS. 16A and 16B are views of an extrusion block intermediate made from waste feedstreams and by a post-production step for sectioning the solid into bricks or tiles.
Figure 16B:
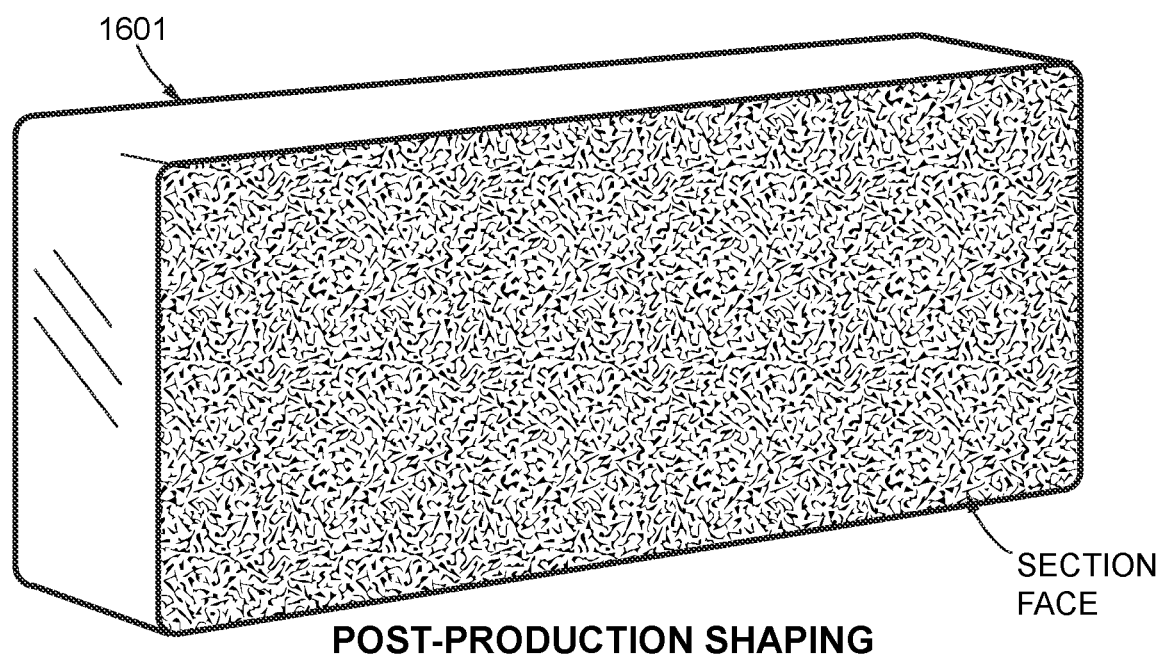

FIGS. 16A and 16B are views of an extrusion block intermediate 1600 made from waste feedstreams and by a post-production step for sectioning the solid into bricks or tiles 1601. While in some instances the matrix is a polymerizable polyurethane precursor, in other instances other matrices may be used. One option is a living matrix such as an algal matt grown in situ in an aqueous nutrient fluidized bed with the waste particles, which is then insolubilized under pressure while preserving the binding strength of the cellular matt to unify the mass of solid waste particles.

Multiple sections or cuts may be made to divide a single slab into multiple products. A clean, homogeneous section face is shown of an impervious and chemically resistant face. By increasing the cross-section and other dimensions of the extruded slab and by sectioning, larger numbers of finished pieces may be made from a single batch intermediate. The blocks may be used in construction, as flood control barriers, as stepping stones, and so forth.

Figure 17A:
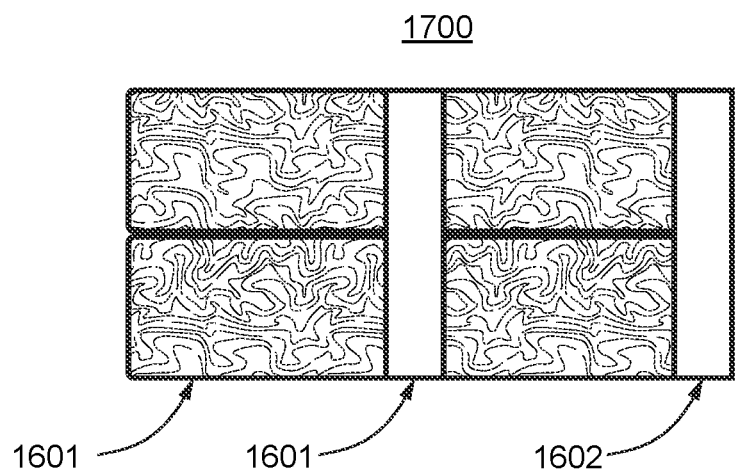
FIGS. 17A and 17B are views of a wall structure having added stiffness and impact resistance.
Figure 17B:
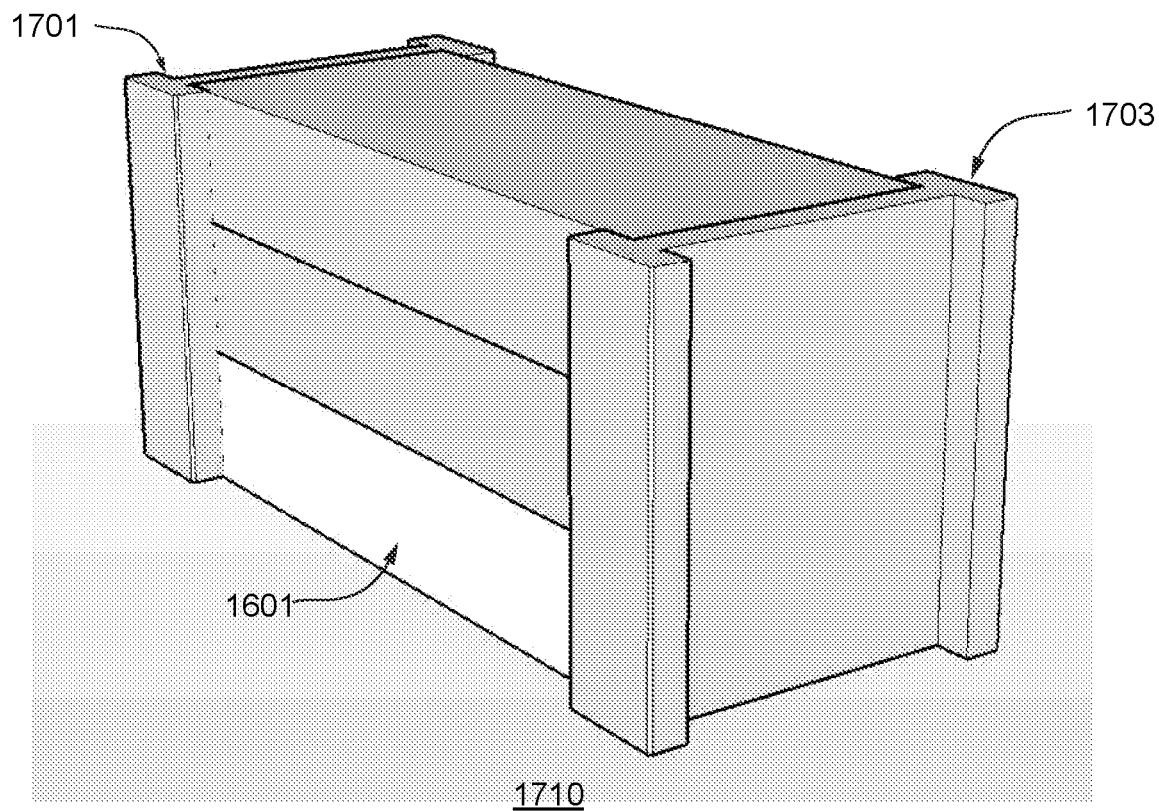

FIGS. 17A and 17B are views of a wall structure 1700 showing stacked bricks 1601. FIG. 17B shows a detail view in perspective of a wall structure 1710 having a pair of H-beams (1701,1703) mounted vertically endwise in support of a stack of bricks 1601, all made from waste. H-beams made from solid waste in a polymerized matrix of the invention may include a cross-linking agent and carbon fiber or glass fiber, for example, for added stiffness and bending strength.

Bricks 1601 are stacked to a needed height. Mortar or other adhesive/sealant may be applied between the bricks. For added strength, vertical beams 1701, 1702 are placed between columns of bricks. FIG. 17B shows a detail view in perspective of a pair of H-beams 1703 mounted vertically supporting a wall 1710 of bricks 1601, all made from waste solids. The construction may be mortar-less, or may include a filler. The blocks may include a hollow center, and the hollow center can be filled and sealed with a waste fiber insulation filler, for example. By building the wall without mortar or other filler, the wall can be disassembled and moved with minimal effort. These structures may be used in a variety of temporary and permanent construction and landscaping applications.

Figure 18A:
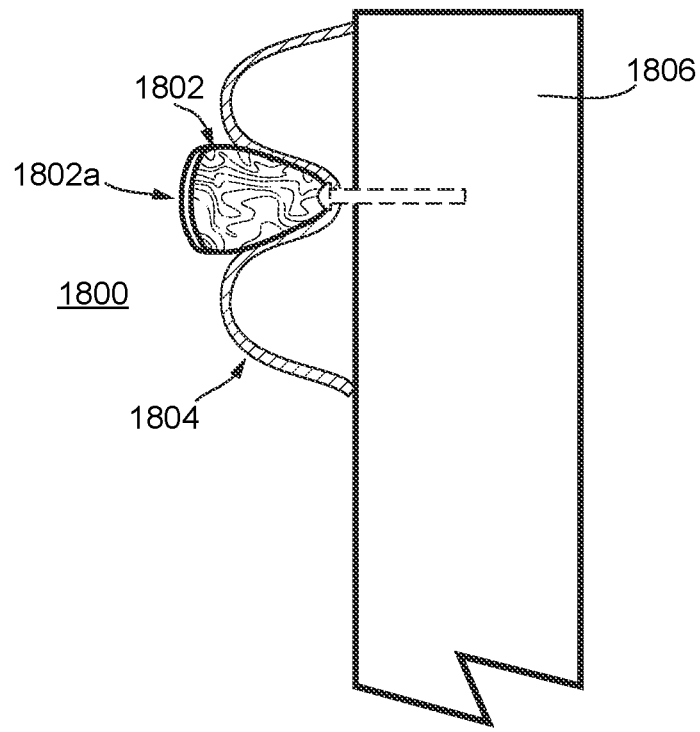
FIGS. 18A and 18B are views of a highway guardrail assembly.
Figure 18B:
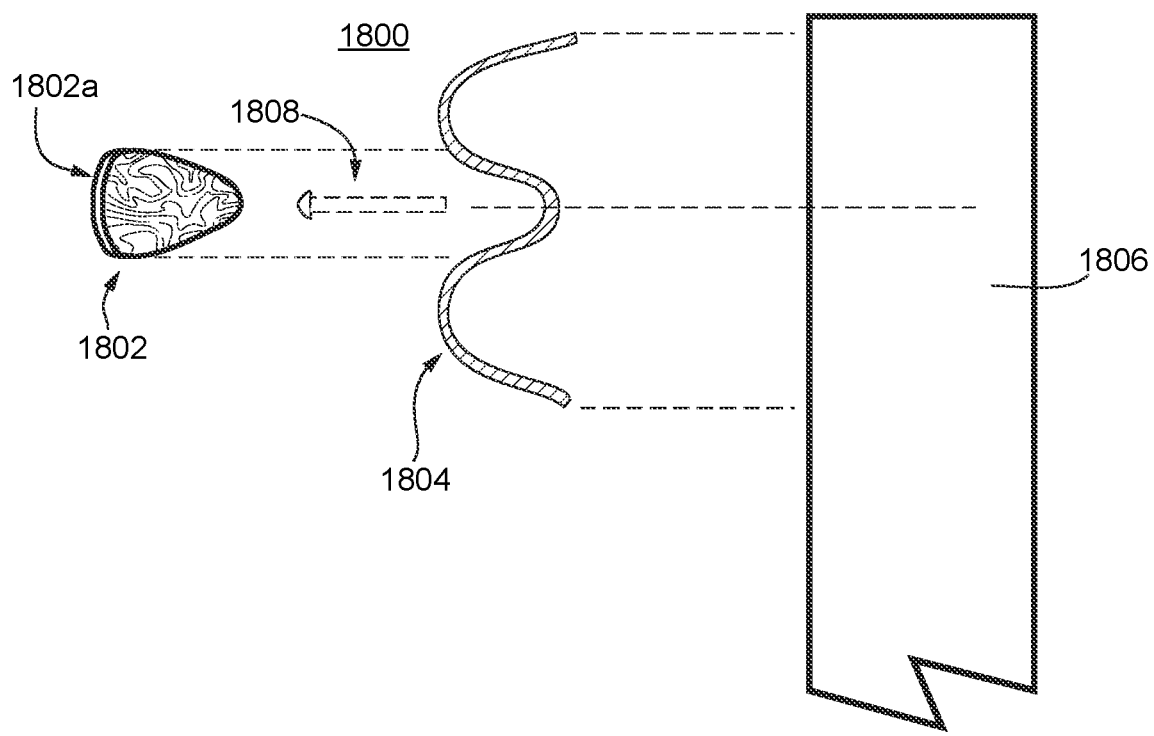

FIGS. 18A and 18B are views of a highway guardrail assembly 1800 in which a steel guardrail 1804 is protected by rubbery waste product "bumpers" 1802 and the guardrail is mounted on vertical posts 1806 using bolts 1808. The bumpers may be secured using an impedance fit, for example, or adhered in place. The bumpers may be coated with reflective layer 1802a for improved visibility. The guardrail is placed parallel to the sides of a road or bridge for highway safety.

The guardrail assembly 1800 is shown in exploded view in FIG. 18B. Conventional guardrails are mounted on creosote-treated wood posts 1806 with pins 1808 that break away on direct impact and withstand glancing blows to the metal rail. A spacer is often used to set the guardrail away from the post so that not all collisions result in breakage of the posts. While significant damage results to the vehicle and the guardrail, lives have been saved by these structures. However, they are difficult to see at night when driving parallel to the guardrail. The bumpers may receive a coating of a white, colored or reflective layer 1802a so as to improve visibility in darkness.

In another embodiment, the vertical post 1806 may also be made of the waste composite. The material stiffness and bending moment of the post can be adjusted by formulating with longer fibers or with a stiffer binder, and the bending and breakaway strength can be selected to optimize highway safety. Toxic creosote or organotins are no longer needed because the matrix may be formulated to be rot-resistant.

Figure 19A:
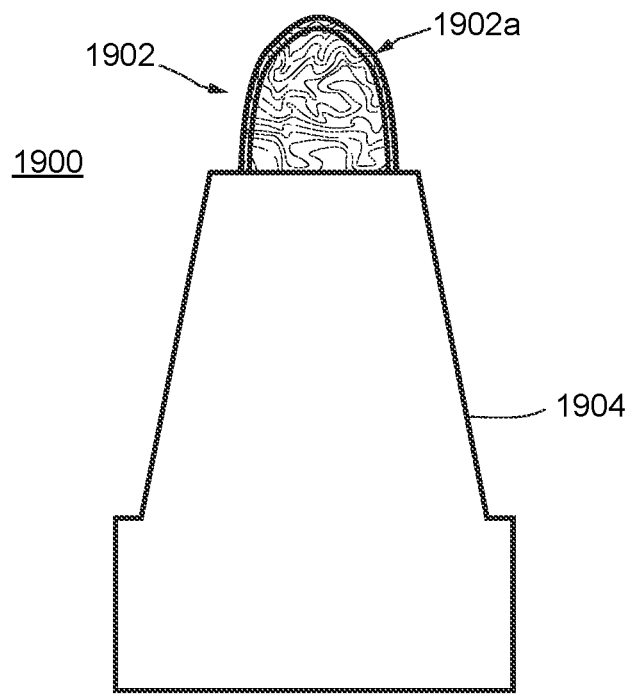
FIGS. 19A and 19B are views of a reflective highway barrier having a rubbery bumper or bumpers on the top of a cementitious block.
Figure 19B:
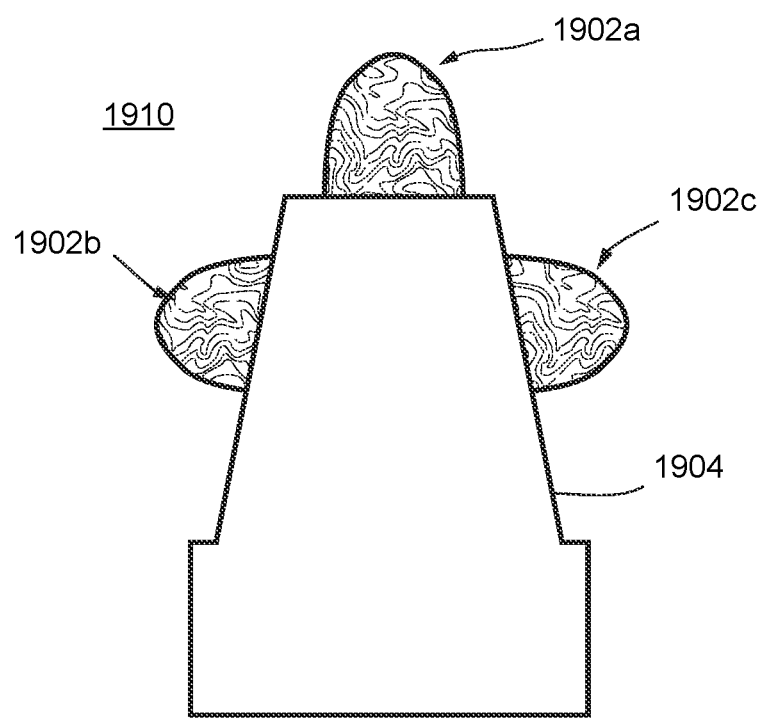

FIGS. 19A and 19B are views of a highway barrier having one or more rubbery bumpers on the top and side surfaces of a cementitious block. In FIG. 19A, highway barrier 1900 is provided with a rubbery bumper 1902 on the top of a cementitious block 1904. A white or reflective coating 1902a is applied to the bumper for improved visibility, or alternatively, the binder used includes a white or reflective pigment so as to improve visibility in traffic. The bumpers may be affixed to the concrete with adhesive or with fasteners, or may be inserted into a groove in the concrete block surface.

FIG. 19B shows a highway barrier 1910 with multiple bumpers 1902a, 19102b, 1902c mounted on the faces of a cementitious block 1904. The protective bumpers limit the cost of a slow speed collision to minor damage, and again a coating may be applied to improve visibility. The bumpers may receive a coating of a white, colored or reflective layer so as to improve visibility in traffic.

In yet another embodiment, the highway barrier may be a barrier formed as large block analogous to that (1904 shown in FIG. 19A), but formed of the recycled material instead of concrete, thus gaining improved fragmentation resistance and impact resistance, and like concrete, may be fire resistant. Weight may be adjusted by varying the weight of crumb rubber to 3-tab aggregate for example, and gravel may also be embedded in the matrix for weight if desired. The barrier members are readily recycled after end-of life-as other products.

Figure 20A:
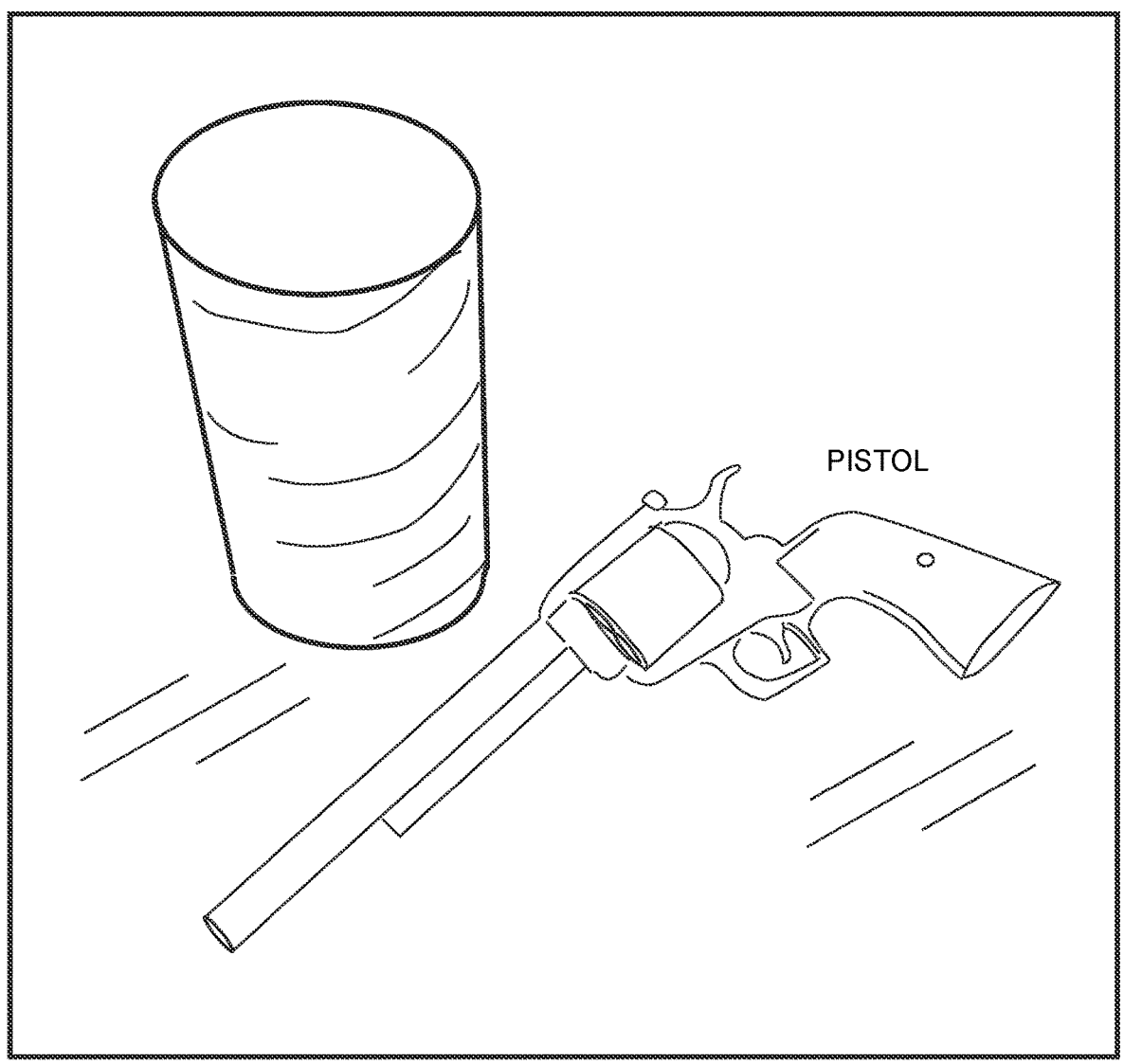
FIG. 20A is a photograph of a 4" cylinder of the finished product and of a large caliber handgun to be used in testing impact resistance of the product.

FIG. 20A is a photograph of a 4" cylinder of the finished product and of a large caliber handgun to be used in testing impact resistance of the product.

Figure 20B:
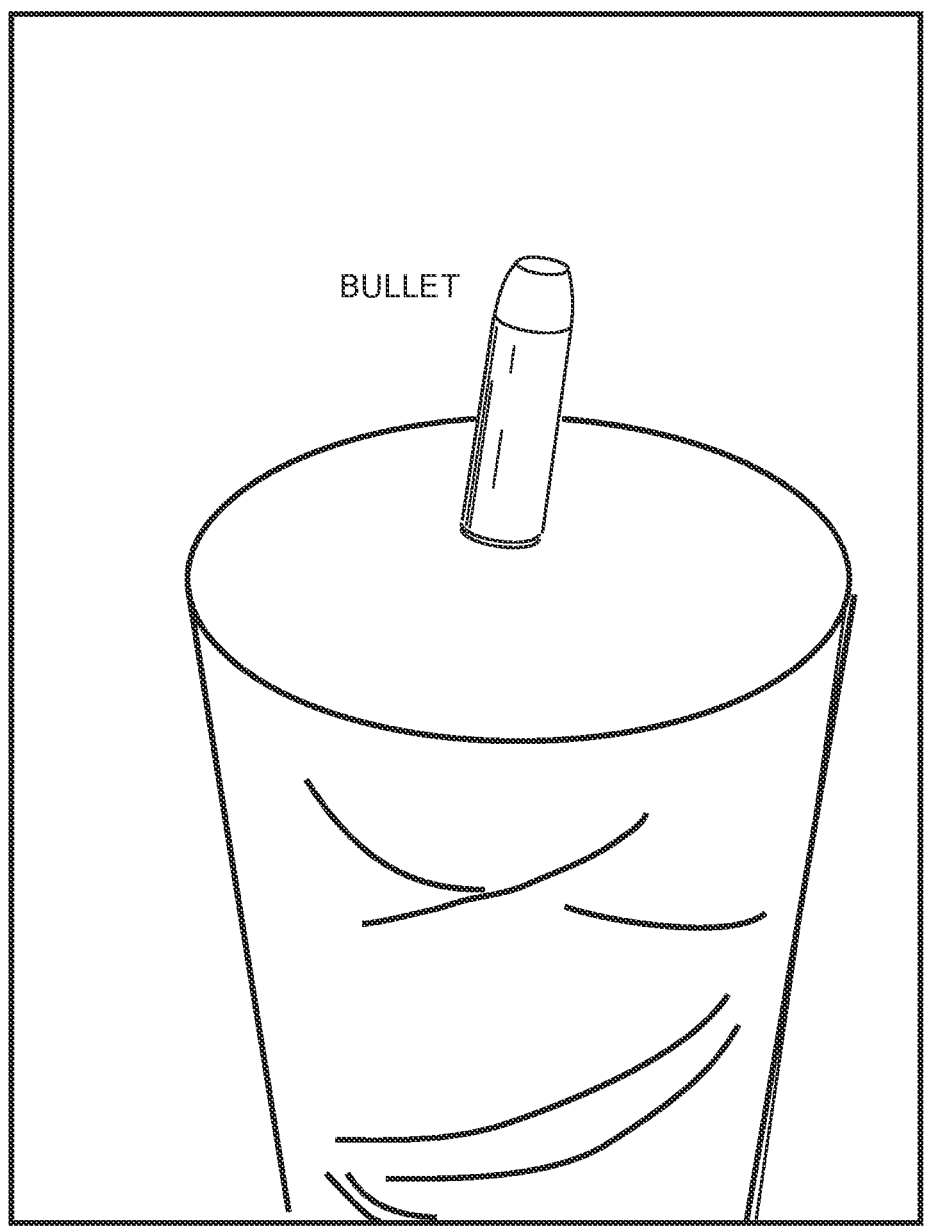
FIG. 20B shows the finished product after absorbing two bullets to the butt end of the plug. A bullet is shown for size comparison.

FIG. 20B shows the finished product after absorbing two bullets to the butt end of the plug. A bullet is shown for size comparison.

Figure 20C:
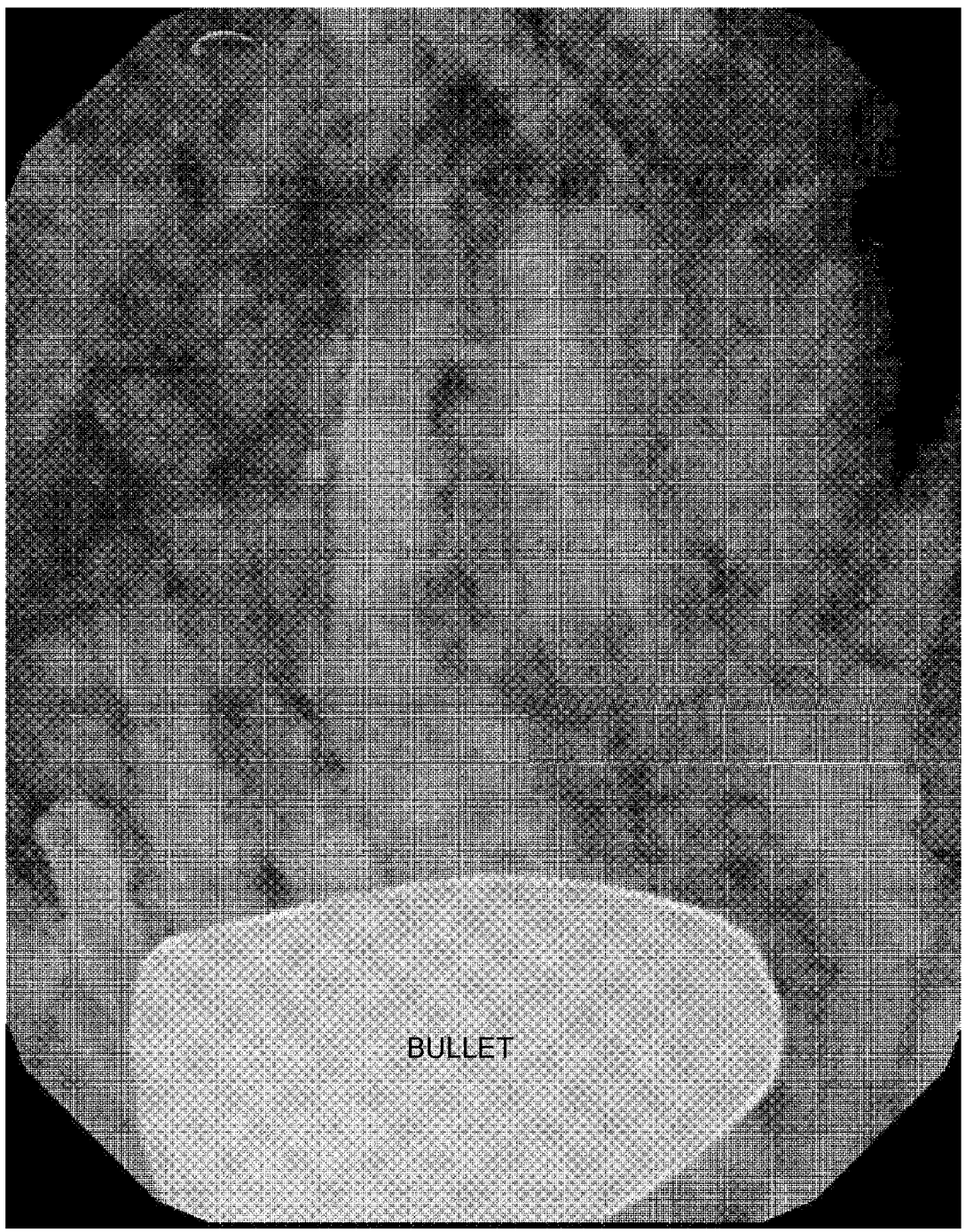
FIG. 20C is an XRay of the finished product showing one of the bullets embedded in the matrix. The bullet head is rounded by the impact.

FIG. 20C is an XRay of the finished product showing one of the bullets (white) embedded in the more XRay translucent (dark) matrix. The bullet head is rounded and worn down by the impact as expected, and points to the utility of the structural products where impact is an issue. In one example, the products are used as structural layers to protect surfaces from impacts of hurricane-driven debris, and do not fragment or shatter.

EXAMPLE I

In an early feasibility example, tire chipped waste (#10-#13 mesh), 3-tab shingle waste (particulate) and chopped waste carpet fiber were mixed in a 40:40:20 (v/v) ratio. The mixed material was placed inside a 1" PVC pipe mold to a depth of about 3 inches and a dollop of polyurethane binder was added. The mold was vented at one end and pressurized at the other using a jack fitted with a piston that fits snuggly into the pipe mold. When a pressure of 400 psi was reached, the mold was allowed to sit under pressure until hardened. The PVC pipe was then cut lengthwise so that the formed sample could be removed. FIG. 6A is a photograph of a representative sample. The polyurethane binder used was a diisocyanate resin. Products of this kind are dense and highly impact resistant; as was demonstrated as described in Example III.

EXAMPLE II

In a second example, waste carpet fiber and 3-tab shingle waste recovered from pre-landfill processing are mixed with crumb rubber in defined proportions and placed in a pipe mold. A freshly prepared fire repellant/isocyanate binder liquid mix was added and the mixture was mixed with the solids using a mechanical blade. The mold was packed under hand pressure and a cap inserted over the opening. Surprisingly, a chemical reaction between the fire repellant and polyurethane binder resulted in a dramatic increase in the volume of the matrix, as was sufficient to lift the cap and fill any void volumes in mold, resulting in a less dense product. The quantity of binder was sufficient to form a solid that retains the shape of the mold after hardening. Once the mold is filled, the material hardens as a monolithic solid piece that conforms in shape to the interior of the mold and binds the crumb rubber and other solids in a rigid, hard matrix. Surprisingly, the fiber waste and bituminous roofing tile waste are not detected in the end product in discrete form (FIGS. 10, 12 and 13 are photographs of representative examples). Crumb rubber and siliceous grit are evident as dispersed particulates in a polyurethane binder matrix. However, when exposed to the flame of a propane torch, no combustion, smoking or charring was noted as shown in FIG. 11.

The binder used was a diisocyanate resin; the fire retardant was a mixture of zinc borate, sodium silicate, and iron oxide in about 20% water by weight. For example, methylene diphenyl diisocyanate (MDI), sold under the trademark name RUBINATE 5005®, may be purchased from Huntsman (USA) and used as a polyurethane precursor.

The water in the fire retardant acts as a blowing agent, causing a part of the polyurethane precursor to generate carbon dioxide microbubbles. The resulting product floats and is a convincing lumber substitute with improved weathering properties. The lumber substitute is sawable, machineable, drillable and paintable using oil-based paints, but has a density equivalent to wood and yet is resistant to rot by termites or mold. The floatability is demonstrated in Example IV.

EXAMPLE III

In a demonstration of impact resistance, a 44-Magnum caliber metal jacket round was fired from a distance of about 3 feet into a 4"×9" slab of composite material of Example I, the sample having a composition of 50% crumb rubber, 45% 3-tab shingle debris, and 5% carpet fiber in a polyurethane binder, the sample having about a 9:1 ratio of solids to binder by weight. The sample was compressed under pressure before testing. The sample was dense and did not float.

A 4" cylinder of the finished product was used to test impact resistance of the product. The finished product absorbed two bullets to the butt end of the cylinder. A bullet is shown for size comparison in FIG. 20B. FIG. 20C is an XRay of the finished product showing one of the bullets embedded in the matrix with no evidence of disruption of the matrix. The shoulders of the bullet are worn down, suggesting that the roofing grit was effective as carborundum in preventing penetration. The bullets were detected about 6½ inches into the material, a remarkable level of stopping power. No fragmentation or shattering of the product was detected and in some tests with samples having a lower degree of crosslinking, the material appeared to seal around the bullet entry.

The ballistic test was done with a 40 Cal bullet fired from a hand gun 3 ft from the target. Both bullets stuck into the material, one penetrated 6.5"; the other 7". The total length of test sample was 9 inch in length.

EXAMPLE IV

A sample of a lumber substitute was made as follows: a waste solids mixture containing about 50% 3-tab shingle debris, 45% tire crumb rubber, and 5% waste carpet fiber was prepared. About 1.25 kilograms of solid waste were used in the batch. A binder mixture with 138 gms isocyanate resin and 8 gms aqueous fire retardant (aqueous zinc borate, sodium silicate and iron oxide in about equal proportions) was added with mechanical mixing to disperse the resin in the solids. The material was molded in a 4 inch pipe under light pressure and formed a cylinder about 7.5" high. The product was lightweight and had a closed cell foam structure of microbubbles in a rigid matrix containing crumb rubber particles and grit. The final density was 0.9 specific gravity. The product was found to float on water as shown in FIG. 13 and is fire resistant.

EXAMPLE V

A sample of a lumber substitute was made as follows: a waste solids mixture containing about 90% 3-tab shingle debris and 10% tire "fluff" as fiber waste was prepared. About 1.29 kilograms of solid waste were used in the batch. A binder mixture with 140 gms isocyanate resin and 8 gms aqueous fire retardant (aqueous zinc borate, sodium silicate and iron oxide in about equal proportions) was added with mechanical mixing to disperse the resin in the solids. The material was molded in a 4 inch pipe under light pressure and formed a cylinder about 9.3" high. The product was lightweight and had a closed cell foam structure of microbubbles in a rigid matrix containing grit and polyester fiber. The final density was 0.75 specific gravity. The product was found to float on water and is fire resistant.

EXAMPLE VI

Make a sample of a lumber substitute as follows: prepare a waste solids mixture containing 100% 3-tab shingle debris. About 1.0 kg of solid waste is needed. Add a binder mixture with 180 gms isophorone diisocyanate resin, 20 gm cane sugar as a crosslinker, diazabicyclo[2,2,2]octane or stannous octanoate/triethanolamine as a catalyst, and 10 gm aqueous fire retardant (aqueous zinc borate, sodium silicate and iron oxide in about equal proportions) with mechanical mixing to disperse the resin in the solids. A urethane pre-polymer is sometimes used to control viscosity of the resin. Mold the material in a slot having dimensions of 0.6"×14"×18" under light pressure to form a rectilinear shingle-like solid about having a surprising structural rigidity. The product is lightweight and has a closed cell foam structure of microbubbles in a tough, crosslinked, homogenous matrix. The final density is about 0.5 specific gravity. The product floats on water and is fire resistant. Crosslink density affects the electrical, physical, mechanical and dynamic mechanical properties of the solid. The resulting polyurethane will develop a biofilm over time and can be used in nailing together wood-substitute planters.

Other crosslinkers can include hydroxyl or amine terminated polyesters, polyethers, polycarbonates, or polyolefins such as polycaprolactone polyol, corn glycerol, citric acid, or 3,4,5-triamino-benzoic acid, for example. As an illustration of the varied chemistry, refer to WO/2017/213855 to Raghuraman, US20100093882 to Ohama, U.S. Pat. No. 7,008,995 to Grandhee, U.S. Pat. No. 8,907,012 to Umemura, and U.S. Pat. No. 6,403,665 to Sieker et al, for example, all of which are incorporated in full by reference.

The roofing product 1501 is one illustration of a line of roofing products that can be recycled themselves in a sustainable endless cycle of production, recovery, and remanufacture. The product can be textured to resemble cedar shingles or pottery roofing tiles and may include an overlay of solar cells and wiring, if desired. Glass and organic photovoltaics also can be applied by coating, for example. The material can be engineered with a larger void volume fraction and reduced density in the center so as to increase resistance to heat loss from dwellings, for example. The product has improved water and weathering resistance, and offers limited opportunity for pest damage or fire if made with a fire retardant as described here. Similar products, with or without borates, may be used in irrigation projects as channels and drains.

EXAMPLE VII

Make a sample of a lumber substitute as follows: prepare a waste solids mixture containing 80% 3-tab shingle debris, 15% carpet fiber, and 5% carbon fiber. About 1.0 kg of solid waste is needed. Add a binder mixture with 180 gms isophorone diisocyanate resin, 3,4,5-triamino-benzoic acid as a crosslinker, diazabicyclo[2,2,2]octane as a catalyst, and 10 gms aqueous fire retardant (aqueous zinc borate, sodium silicate and iron oxide in about equal proportions) with mechanical mixing to disperse the resin in the solids. Mold the material in a rectangular slot having dimensions of 0.6"×14"×18" under light pressure to form a rectilinear shingle-like solid about having a surprising structural rigidity. The product is lightweight and has a closed cell foam structure of microbubbles in a tough, crosslinked, homogenous matrix. The final density is about 0.5 specific gravity. The product floats on water and is fire resistant.

EXAMPLE VIII

Coat any of the example products given above with a decorative or reflective surface coating, as for example applied by printing, spraying, or dipping.

In other examples using a coating, printing or dip process, photovoltaic coatings may be applied. Reflective coatings may be applied to reduce heating of buildings by the sun in desert environments, for example.

EXAMPLE IX

Embed tire crumb rubber waste, shingle waste, and carpet fiber waste in a Portland cement binder and allow to harden in a mold.

EXAMPLE X

Prepare a mixture of waste carpet fiber, crumb rubber, and 3-tab shingle waste in defined proportions, sterilize with UV light and agitation, and placed the mixture in a thin transparent mold. Pour in an aqueous nutrient mixture supportive of *Oscillatoria* sp. fibers (e.g., a cyanobacterial nutrient medium), inoculate with a pure culture of a species adapted to grow as a stromatolite-like matt, and incubate for 3 weeks with strong illumination. Press excess water from the resulting matt and dry in the sun, then bake with dry heat to hardness under pressure. Build up layers by accretion to use as a brick in construction.

EXAMPLE XI

Polyurethanes have good biological and environmental compatibility. However, it may be desirable to use an isocyanate precursor, a polymeric resin, and/or a crosslinker derived by a sustainable pathway. In some instances the precursors are plant-based natural products. Some such pathways are described in Kreye et al. 2013. Sustainable routes to polyurethane precursors. Green Chemistry (DIU 10.1039/C3GC40440D which can be accessed online at researchgate.net/publication/236033528_Sustainable_Routes_to_Polyurethane_Precursors and Blazek and Datta. 2019 at time of filing). Renewable natural resources as green alternative substrates to obtain bio-based non-isocyanate polyurethanes-review, Critical Reviews in Environmental Science and Technology 20 Jan. 2019 pp 173-211 (which can be accessed on line at doi.org/10.1080/10643389.2018.1537741 at time of filing). Also of interest is Guan et al. 2011. Progress in study of non-isocyanate polyurethane. Ind Eng Chem Res 50, 11, 6517-6527, which can be accessed at pubs.acs.org/doi/abs/10.1021/ie101995j by subscription at time of filing. This literature is incorporated in full by reference for all that it teaches.

EXAMPLE XII

Other binders may be used. Useful polymers include ethylene oxide, polybutadiene, hydrogenated-butadienes, polyisoprenes, and polyacrylates, for example, either as pure polymeric species, polymeric grafts or block copolymers. Proteins, chitins, collagens, and polysaccharides are other examples of useful polymers. Sustainable binders result in products fully capable of being labelled "green". Isocyanate substitutes for crosslinking graft- and block-copolymers include carbodiimides and epoxies. Products are prepared from precursors and crosslinkers using one or more block or graft copolymers. One such isocyanate-free polymer is described in WO/2012/171659 to Bahr et al. Other examples will occur to those skilled in the art by extension of the teachings and illustrations of this disclosure.

The binders may include a variety of fire retardants, crosslinking and reinforcing agents not limited to those disclosed above. Examples of reinforcing agents include polyaramide fibers, Nomex fibers, Technora® fibers, carbon fibers, fiberglass fibers, silk, plant-derived fibers including coconut and hemp, siliceous fibers, and so forth.

EXAMPLE XIII

The material from products made as described here from waste streams is granulated and recycled for new products by admixture with other solid waste by a process of mixing with binder and casting or extruding the new products, thus achieving the long-sought capacity by which an end-of-life product is recycled into products that themselves can be re-used—the result an endless cycle sustainable process for making more new products. And by this means achieving the capacity to make and remake multigenerational products from solid wastes and to reduce loading of landfills.

EXAMPLE XIV

A slug of the material made in Example III, which had shown strong impact and fragmentation resistance, was shown to be machineable on a circular saw. A slice of the material was then affixed to another slice using a hammer and nails as a demonstration of its use in construction trades.

It is contemplated that articles, apparatus, methods, examples and processes of the claimed invention encompass variations and adaptations developed using information from the embodiments described herein. Adaptation and/or modification of the articles, apparatus, methods, and processes described herein may be performed by those of ordinary skill in the relevant art.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

The mention herein of any publication, for example, in the Background section, is not an admission that the publication serves as prior art with respect to any of the claims presented herein. The Background section is presented for purposes of clarity and is not meant as a description of prior art with respect to any claim.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

The invention claimed is:

1. A structural member, which comprises a mass of solid waste dispersed in a solid matrix,
    a) the mass of solid waste having:
        (i) a fraction of tire waste as crumb rubber;
        (ii) a fraction of bituminous shingle waste;
        (iii) a fraction of fiber waste;
    b) the solid matrix having:
        (i) a polyurethane binder; and,
        (ii) a fire retardant additive.

2. The structural member of claim 1, wherein the fraction of fiber waste comprises carpet fiber waste, tire belt fiber waste, or a mixture of carpet fiber waste and tire belt fiber waste.

3. The structural member of claim 1, wherein the fraction of fiber waste comprises plant-derived fiber waste.

4. The structural member of claim 1, wherein the polyurethane binder is the product of in situ polymerization of a polymerizable precursor, and the polymerizable precursor comprises a polyisocyanate.

5. The structural member of claim 4, wherein the polyurethane binder comprises a polyol or a polyamide.

6. The structural member of claim 4, wherein the polyurethane binder comprises a polyvalent crosslinking agent.

7. The structural member of claim 4, wherein the solid matrix comprises a reinforcement agent.

8. The structural member of claim 1, wherein the mass of solid waste dispersed in the solid matrix is at least 40% by weight.

9. The structural member of claim 1, wherein the mass of solid waste dispersed in the solid matrix is at least 60% by weight.

10. The structural member of claim 1, wherein the fire retardant additive is an aqueous solution of at least one of zinc borate, sodium silicate, and iron oxide, and the aqueous solution is a blowing agent.

11. The structural member of claim 1, which comprises a mass of recycled structural barrier member added to the mass of solid waste dispersed in the solid matrix.

12. The structural member of claim 1, wherein the structural member is adapted as a roofing or fencing member.

13. The structural member of claim 1, wherein the structural member is adapted as a brick, a tile, a wall member, an insulative member, or an acoustic barrier member.

14. The structural member of claim 1, wherein the structural member is adapted as a traffic barrier member.

15. The structural member of claim 1, wherein the structural member is adapted for agricultural structures, irrigation structures, or flood control structures.

16. The structural member of claim 1, which comprises an exterior coating layer on at least one external surface.

17. A barrier member, which comprises a metered mass of solid waste combined in a solid matrix,
(b) the mass of solid waste comprising:
a fraction of comminuted bituminous shingle waste;
a fraction of fiber waste; and,
(b) the solid matrix comprising a polymeric binder.

18. The barrier member of claim 17, wherein the mass of solid waste comprises a fraction of tire waste.

19. The barrier member of claim 17, wherein the fraction of fiber waste comprises carpet fiber waste, tire belt fiber waste, or a mixture of carpet fiber waste and tire belt fiber waste.

20. The barrier member of claim 17, wherein the fraction of fiber waste comprises plant-derived fiber waste.

21. The barrier member of claim 17, wherein the solid matrix is the product of in situ polymerization of a polymerizable precursor.

22. The barrier member of claim 21, wherein the polymerizable precursor is a polyurethane precursor.

23. The barrier member of claim 17, wherein the polymeric binder comprises a polyol, a protein, a chitin, a collagen, or a polysaccharide.

24. The barrier member of claim 17, wherein the polymeric binder comprises a polyvalent crosslinking agent.

25. The barrier member of claim 17, wherein the solid matrix comprises a fiber additive selected from polyaramide fiber, Nomex fiber, Technora® fiber, carbon fiber, fiberglass fiber, silk fiber, coconut fiber, hemp fiber, and siliceous fiber.

26. The barrier member of claim 17, wherein the solid matrix comprises a fire retardant selected from zinc borate, sodium silicate, iron oxide, or a mixture thereof.

27. The barrier member of claim 21, wherein the polymeric precursor comprises a blowing agent.

28. The barrier member of claim 17, wherein the metered mass of solid waste in the solid matrix is at least 40% by weight.

29. The barrier member of claim 17, wherein the metered mass of solid waste in the solid matrix is at least 60% by weight.

30. The barrier member of claim 17, which comprises a mass of recycled barrier member combined with the metered mass of solid waste in the solid matrix.

31. The barrier member of claim 17, wherein the barrier member is adapted as a roofing or a fencing member.

32. The barrier member of claim 17, wherein the barrier member is adapted as an insulative or an acoustic barrier member.

33. The barrier member of claim 17, wherein the barrier member is adapted as an emergency barrier member.

34. The barrier member of claim 17, wherein the barrier member is adapted as an impact-resistant structural member.

35. The barrier member of claim 17, which comprises an exterior coating layer on at least one surface.

36. The barrier member of claim 35, wherein the exterior coating layer is a reflective coating, a white coating, a colored coating, a sealant coating, a photovoltaic coating, a hydrophilic coating, or a hydrophobic coating.

37. A product-by-process, wherein the product is an upcycled structural member or a barrier member produced by forming a solid matrix with a metered mass of solid waste, the metered mass of solid waste comprising a fraction of comminuted bituminous shingle waste and a fraction of fiber waste.

38. The product-by-process of claim 37, wherein the metered mass of solid waste further comprises a fraction of tire waste.

39. The product-by-process of claim 37, wherein the solid matrix comprises one or more of a blowing agent, a crosslinking agent, or a reinforcing agent.

* * * * *